US009985524B2

(12) United States Patent
Okada et al.

(10) Patent No.: US 9,985,524 B2
(45) Date of Patent: May 29, 2018

(54) DC/DC CONVERSION DEVICE AND LOAD-DRIVE CONTROL SYSTEM

(71) Applicant: Mitsubishi Electric Corporation, Chiyoda-ku, Tokyo (JP)

(72) Inventors: Yuruki Okada, Tokyo (JP); Yoshinori Yamashita, Tokyo (JP); Sho Kato, Tokyo (JP); Hisanori Yamasaki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days. days.

(21) Appl. No.: 14/915,531

(22) PCT Filed: Oct. 30, 2013

(86) PCT No.: PCT/JP2013/079456
§ 371 (c)(1),
(2) Date: Feb. 29, 2016

(87) PCT Pub. No.: WO2015/063898
PCT Pub. Date: May 7, 2015

(65) Prior Publication Data
US 2016/0211749 A1    Jul. 21, 2016

(51) Int. Cl.
*H02M 3/156*    (2006.01)
*H02M 1/00*    (2006.01)
(Continued)

(52) U.S. Cl.
CPC ............... *H02M 3/158* (2013.01); *B60L 9/22* (2013.01); *B60L 11/1864* (2013.01);
(Continued)

(58) Field of Classification Search
CPC .... H02M 3/158; H02M 3/1584; H02M 7/487; H02M 2001/0007; H02M 2001/0009
See application file for complete search history.

(56) References Cited

U.S. PATENT DOCUMENTS 6,842,354 B1 *   1/2005  Tallam .................. H02M 7/487
                                               363/132
8,536,735 B2 *   9/2013  Yan ...................... H02M 3/3376
                                               307/77
(Continued)

FOREIGN PATENT DOCUMENTS

CA    2543023 A1 * 10/2006 ............ H02M 7/487
JP    6-54547 A      2/1994
(Continued)

OTHER PUBLICATIONS

International Search Report (PCT/ISA/210) dated Jan. 21, 2014, by the Japanese Patent Office as the International Searching Authority for International Application No. PCT/JP2013/079456.
(Continued)

Primary Examiner — Timothy J Dole
Assistant Examiner — Sisay G Tiku
(74) Attorney, Agent, or Firm — Buchanan Ingersoll & Rooney PC

(57) ABSTRACT

A DC/DC conversion device that includes three-level power conversion circuits in a plurality of phases. The DC/DC conversion device includes voltage detectors 21 and 22 that detect at least two voltages (Efc and EfcL) of an input DC voltage, a first divided voltage, and a second divided voltage; and a voltage control unit 3 that controls an output voltage of three-level power conversion circuits 12a and 12b. At least one phase (the power conversion circuit 12b) of the three-level power conversion circuits 12a and 12b operates as an imbalance-reduction phase that executes
(Continued)

imbalance-reduction control such that one (EfcL) of the first and second divided voltages is divided into half of the input DC voltage Efc.

19 Claims, 22 Drawing Sheets

(51) Int. Cl.
*H02M 7/487* (2007.01)
*H02M 3/158* (2006.01)
*B60L 9/22* (2006.01)
*B60L 11/18* (2006.01)
*B60L 15/00* (2006.01)
*H02M 1/08* (2006.01)

(52) U.S. Cl.
CPC ............ *B60L 15/007* (2013.01); *H02M 1/08* (2013.01); *H02M 7/487* (2013.01); *B60L 2200/26* (2013.01); *B60L 2210/10* (2013.01); *B60L 2210/40* (2013.01); *B60L 2240/527* (2013.01); *H02M 3/1584* (2013.01); *H02M 2001/0009* (2013.01); *Y02T 10/645* (2013.01); *Y02T 10/7005* (2013.01); *Y02T 10/7061* (2013.01); *Y02T 10/7216* (2013.01); *Y02T 10/7241* (2013.01)

(56) References Cited

U.S. PATENT DOCUMENTS

| | | | | |
|---|---|---|---|---|
| 9,077,255 | B2* | 7/2015 | Fu | H02M 3/33546 |
| 9,509,229 | B2* | 11/2016 | Lee | H02M 7/53875 |
| 2002/0048181 | A1* | 4/2002 | Kobayashi | H02M 1/12 363/71 |
| 2004/0233685 | A1 | 11/2004 | Matsuo et al. | |
| 2007/0211501 | A1* | 9/2007 | Zargari | H02M 5/4585 363/39 |
| 2008/0304301 | A1* | 12/2008 | Nishio | H02M 7/487 363/132 |
| 2011/0134672 | A1* | 6/2011 | Sato | H02M 1/10 363/126 |
| 2012/0155124 | A1* | 6/2012 | Cheng | H02M 3/337 363/24 |
| 2013/0002186 | A1 | 1/2013 | Iwahori | |
| 2015/0002066 | A1* | 1/2015 | Oda | H02M 5/4585 318/500 |
| 2016/0172976 | A1* | 6/2016 | Mu | H02M 7/487 323/271 |
| 2016/0329811 | A1* | 11/2016 | Du | H02M 3/1584 |

FOREIGN PATENT DOCUMENTS

| | | |
|---|---|---|
| JP | 2003-199354 A | 7/2003 |
| JP | 2005-237125 A | 9/2005 |
| JP | 2009-232630 A | 10/2009 |
| WO | 01/52397 A1 | 7/2001 |
| WO | WO 2010/021052 A1 | 2/2010 |
| WO | WO 2011/102082 A1 | 8/2011 |

OTHER PUBLICATIONS

Written Opinion (PCT/ISA/237) dated Jan. 21, 2014, by the Japanese Patent Office as the International Searching Authority for International Application No. PCT/JP2013/079456.

Extended European Search Report dated Jun. 27, 2017, by the European Patent Office in corresponding European Patent Application No. 13896543.9 (9 pages).

Canadian Office Action dated Dec. 1, 2017, by the Canadian Intellectual Property Office in corresponding Canadian Patent Application No. 2,928,611 (4 pages).

* cited by examiner

FIG.5

|  | (1)-1<br>(2)-1 | (1)-2<br>(2)-2 | (1)-3<br>(2)-3 |
|---|---|---|---|
| S1a | OFF | OFF | ON |
| S2a | OFF | ON | ON |
| S3a | ON | ON | OFF |
| S4a | ON | OFF | OFF |

FIG.8

|     | Ed<(Efc/2) | | Ed>(Efc/2) | |
| --- | --- | --- | --- | --- |
|     | (4)-1<br>(3)-1 | (4)-2<br>(3)-2 | (6)-1<br>(5)-1 | (6)-2<br>(5)-2 |
| S1b | OFF | OFF | ON | OFF |
| S2b | OFF | ON | ON | ON |
| S3b | ON | ON | OFF | ON |
| S4b | ON | OFF | OFF | OFF |

DC/DC CONVERSION DEVICE AND LOAD-DRIVE CONTROL SYSTEM

FIELD

The present invention relates to a DC/DC conversion device that is, for example, suitable for use with a railway vehicle, and also relates to a load-drive control system including the DC/DC conversion device.

BACKGROUND

An electric car that is a power car for a railway vehicle has a configuration in which power is obtained by a current collector from an overhead wire, a third rail, or the like (hereinafter, abbreviated as "overhead wire or the like" as needed) to drive an electric motor that uses the collected power. In the electric car, a DC/DC conversion device is used as a functional unit that converts a DC voltage applied from the overhead wire or the like to a different DC voltage (a lower voltage level for the electric car).

The DC/DC conversion device is configured to include at least one voltage-conversion circuit unit (which is also referred to as "power-conversion circuit unit") in which an upper-arm switching element and a lower-arm switching element are connected in series. While it is more common to use a power-conversion circuit unit with a two-level configuration, a power-conversion circuit unit with a three-level configuration, in which the potential at a neutral point can be used, is used in a case where the input voltage is higher relative to the withstand voltage of the switching elements. In a power-conversion circuit unit with a three-level configuration, two capacitors are provided on the input-terminal side thereof, with the capacitors being connected in series and being equal in capacitance value. This is so that it is possible to select from among three potential levels: a high potential, an intermediate potential, and zero potential.

In a power-conversion circuit unit with a three-level configuration, a capacitor on the high-potential (high-order potential) side and a capacitor on the low-potential (low-order potential) side are equal in capacitance value. Therefore, the voltages of both the capacitors are typically equal to each other. However, it is known that, depending on the control mode of the switching elements in the power-conversion circuit unit, differences occur in voltage (an imbalance) between the capacitors. When there is a difference in voltage between the capacitor on the high-potential side and the capacitor on the low-potential side, the potential at the neutral point varies, which is not desirable for the operation of a power-conversion circuit unit.

For the DC/DC conversion device with a three-level power conversion unit as described above, there is an example disclosed in Patent Literature 1 listed below of a technique using a pulse-width modulation device in order to reduce variations in potential at a neutral point. With the pulse-width modulation device, according to the magnitude of a DC component included in each of two switching functions for respectively generating a high-potential pulse train and a low-potential pulse train of an output terminal voltage, or according to the value equivalent to the magnitude of the DC component, a difference in the DC component between the switching functions is adjusted; or according to the voltage difference between two divided voltages of a DC voltage source at a DC-side intermediate potential point, or according to the value equivalent to the voltage difference, the difference in an AC component between the switching functions is adjusted. Thus, variations in potential at a neutral point are thereby reduced.

CITATION LIST

Patent Literature

Patent Literature 1: Japanese Patent Application Laid-open No. H6-54547

SUMMARY

Technical Problem

However, the above known technique relates to a three-level inverter device (a DC/AC conversion device), and is not applicable to a DC/DC conversion device. There is an AC terminal on an output side of the inverter device and the potential at an output terminal is switched between opposite polarities at each AC cycle. In contrast, in a DC/DC conversion device, the polarity of an output terminal is not varied. Therefore, it is difficult to employ the known technique to switch between the polarities at each AC cycle in order to reduce variations in potential at a neutral point.

The present invention has been achieved to solve the above problems, and an objective of the present invention is to provide a DC/DC conversion device that can reduce variations in potential at a neutral point even when a three-level power conversion circuit is applied to DC/DC conversion and is to provide a load-drive control system including the DC/DC conversion device.

Solution to Problem

In order to solve the problem and achieve the objective mentioned above, the present invention relates to a DC/DC conversion device that is configured to include three-level power conversion circuits in a plurality of phases, each of the three-level power conversion circuits converting a voltage to three levels of potential by using a first and a second divided voltages respectively obtained by dividing an input DC voltage by using two capacitors connected in series. The DC/DC conversion device includes: voltage detectors that detect at least two of the input DC voltage, the first divided voltage, and the second divided voltage; and a voltage control unit that controls an output voltage of the three-level power conversion circuits on the basis of a voltage command value. At least one of the phases of the three-level power conversion circuits operates as an imbalance-reduction phase that executes imbalance-reduction control such that one of the first and second divided voltages is divided into a value that is half of the input DC voltage.

Advantageous Effects of Invention

According to the present invention, even in a case where a three-level power conversion circuit is applied to DC/DC conversion, variations in potential at a neutral point can be reduced.

BRIEF DESCRIPTION OF DRAWINGS

FIG. 5 is a diagram illustrating a switching pattern for switching elements of a power conversion phase.

FIG. 8 is a diagram illustrating a switching pattern for switching elements of an imbalance-reduction phase.

DESCRIPTION OF EMBODIMENTS

Exemplary embodiments of a DC/DC conversion device according to the present invention will be explained below in detail with reference to the accompanying drawings. The present invention is not limited to the embodiments.

First Embodiment

Figure 1:
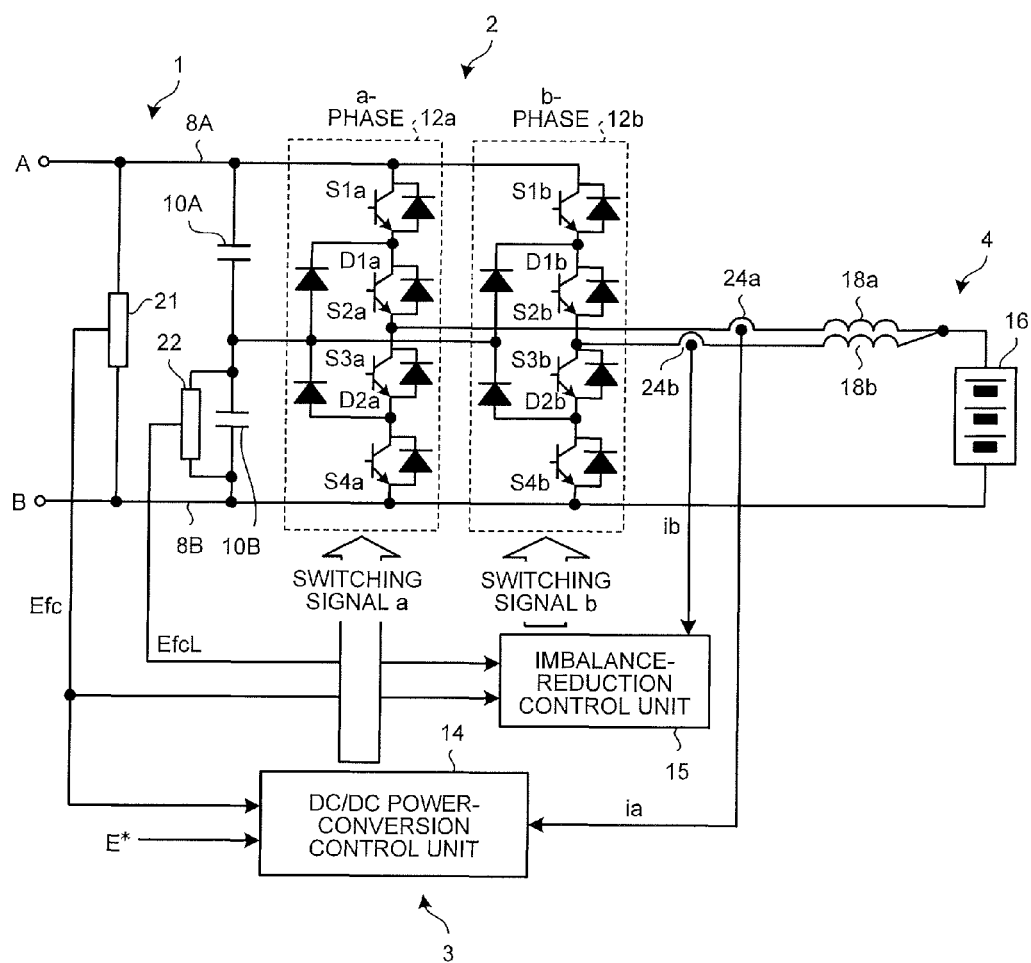
FIG. 1 is a diagram illustrating a configuration of a DC/DC conversion device according to a first embodiment.

FIG. 1 is a diagram illustrating a configuration of a DC/DC conversion device according to a first embodiment; the configurations of a DC circuit unit 1, a power-conversion circuit unit 2, and a voltage control unit 3 included in the three-level DC/DC conversion device; and the configuration of a DC load 4.

The DC circuit unit 1 is configured to include capacitors 10A and 10B. The capacitors 10A and 10B are connected in series between DC bus-bars 8A and 8B. The DC bus-bars 8A and 8B are electrically connected to DC power-supply terminals A and B, respectively, and they are supplied with a DC voltage (an input DC voltage) from the DC power-supply terminals A and B in order to divide the input DC voltage into two. An electrical connection point between the capacitors 10A and 10B is led out as an intermediate potential terminal to the power-conversion circuit unit 2 at the subsequent stage.

The power-conversion circuit unit 2 is configured to include a three-level power conversion circuit 12a (denoted as "a-phase" for convenience) and to include a three-level power conversion circuit 12b (denoted as "b-phase" for convenience). The power conversion circuits 12a and 12b are connected in parallel to the capacitors 10A and 10B that are connected in series, and they convert the voltage to three levels of potential (a high potential, an intermediate potential, and a zero potential) by using the divided two voltages divided respectively by the capacitors 10A and 10B.

In the power conversion circuit 12a, four switching elements S1a to S4a are connected in series, in each of which a transistor element and a diode are connected in inverse parallel. A cathode of a neutral-point clamp diode D1a on a high-order potential side is connected at a connection point between the switching element S1a positioned on an outer side of the high-order potential side and the switching element S2a positioned on an inner side of the high-order potential side. An anode of the neutral-point clamp diode D1a is connected to a cathode of a neutral-point clamp diode D2a on a low-order potential side and it is also electrically connected to the intermediate potential terminal led out from the DC circuit unit 1.

In contrast, an anode of the neutral-point clamp diode D2a on the low-order potential side is connected to a connection point between the switching element S3a positioned on the inner side of the low-order potential side and the switching element S4a positioned on the outer side of the low-order potential side. The cathode of the neutral-point clamp diode D1a is electrically connected to the intermediate potential terminal as described above. A connection point between the switching elements S2a and S3a is led out as a first DC terminal, and it is connected to the positive side of a battery 16 that serves as the DC load 4 via a reactor 18a.

The configuration and connections of the power conversion circuit 12b, which includes switching elements S1b to S4b and neutral-point clamp diodes D1b and D2b, are identical to those of the power conversion circuit 12a. A connection point between the neutral-point clamp diodes D1b and D2b is electrically connected to the intermediate potential terminal. A connection point between the switching elements S2b and S1b is led out as a first DC terminal, and it is connected to the positive side of the battery 16 that serves as the DC load 4 through a reactor 18b.

The battery 16 is preferably a nickel-hydrogen secondary battery, a lithium-ion secondary battery, an electric double-layer capacitor, or the like. However, other batteries can also be used. The negative side of the battery 16 is connected to the low-order potential side of the switching elements S4a and S4b in order to send/receive DC power between the battery 16 and the power-conversion circuit unit 2.

The voltage control unit 3 is configured to include a DC/DC power-conversion control unit 14 and an imbalance reduction control unit 15. The power-conversion circuit unit 2 is provided with a voltage detector (a first voltage detector) 21 that detects a voltage between the capacitors 10A and 10B connected in series; a voltage detector (a second voltage detector) 22 that detects a voltage of the capacitor 10B; a current detector (a first current detector) 24a that detects a current flowing in/out through an output terminal of the power conversion circuit 12a; and a current detector (a second current detector) 24b that detects a current flowing in/out through an output terminal of the power conversion circuit 12b.

A voltage (an input voltage) Efc detected by the voltage detector 21, a current (a charging/discharging current) ia detected by the current detector 24a, and a command value E* (such as a voltage command value and a current command value) are input to the DC/DC power-conversion control unit 14. The input voltage Efc, a voltage (low-order-side divided voltage: first divided voltage) EfcL detected by the voltage detector 22 and a current ("imbalance reduction current" described later) ib detected by the current detector 24b are input to the imbalance-reduction control unit 15.

On the basis of the input voltage Efc, the charging/discharging current ia, and the command value E*, the DC/DC power-conversion control unit 14 generates a switching signal "a" for controlling the switching elements S1a to S4a included in the power conversion circuit 12a that serves as a DC/DC power conversion phase (hereinafter, simply referred to as "power conversion phase"), and it outputs the switching signal "a" to the power conversion circuit 12a.

On the basis of the input voltage Efc, the low-order-side divided voltage EfcL, and the imbalance-reduction current ib, the imbalance-reduction control unit 15 generates a switching signal "b" for controlling the switching elements S1b to S4b included in the power conversion circuit 12b that serves as an imbalance-reduction phase, and the switching signal "b" is output to the power conversion circuit 12b.

Figure 2:
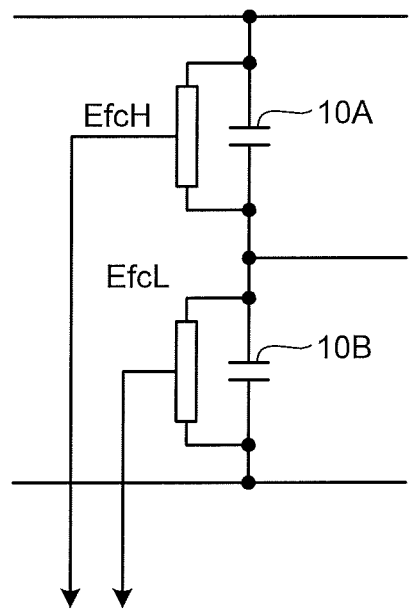
FIG. 2 is a diagram illustrating an arrangement example of first and second voltage detectors different from that of FIG. 1 in arrangement.

In FIG. 1, the configuration is such that the first voltage detector detects the input voltage Efc, and the second voltage detector detects the low-order-side divided voltage EfcL (first divided voltage). However, as illustrated in FIG. 2, the configuration can be such that the first voltage detector detects a high-order-side divided voltage EfcH (second divided voltage), and the second voltage detector detects the low-order-side divided voltage EfcL (first divided voltage). The input voltage Efc is obtained as the sum of the high-order-side divided voltage EfcH and the low-order-side divided voltage EfcL. Therefore, both the high-order-side divided voltage EfcH and the low-order-side divided voltage EfcL may be input to the DC/DC power-conversion control unit 14.

Figure 3:
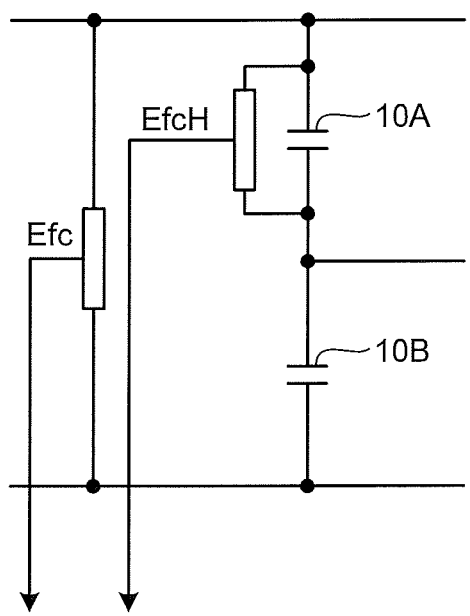
FIG. 3 is a diagram illustrating an arrangement example of the first and second voltage detectors different from that of FIGS. 1 and 2 in arrangement.

Further, as illustrated in FIG. 3, the configuration can be such that the first voltage detector detects the input voltage Efc, and the second voltage detector detects the high-order-side divided voltage EfcH. The high-order-side divided voltage EfcH is also an electric quantity that represents the voltage imbalance between the capacitors 10A and 10B.

Therefore, this high-order-side divided voltage EfcH may be input to the power conversion circuit 12b that serves as an imbalance-reduction phase.

Figure 4:
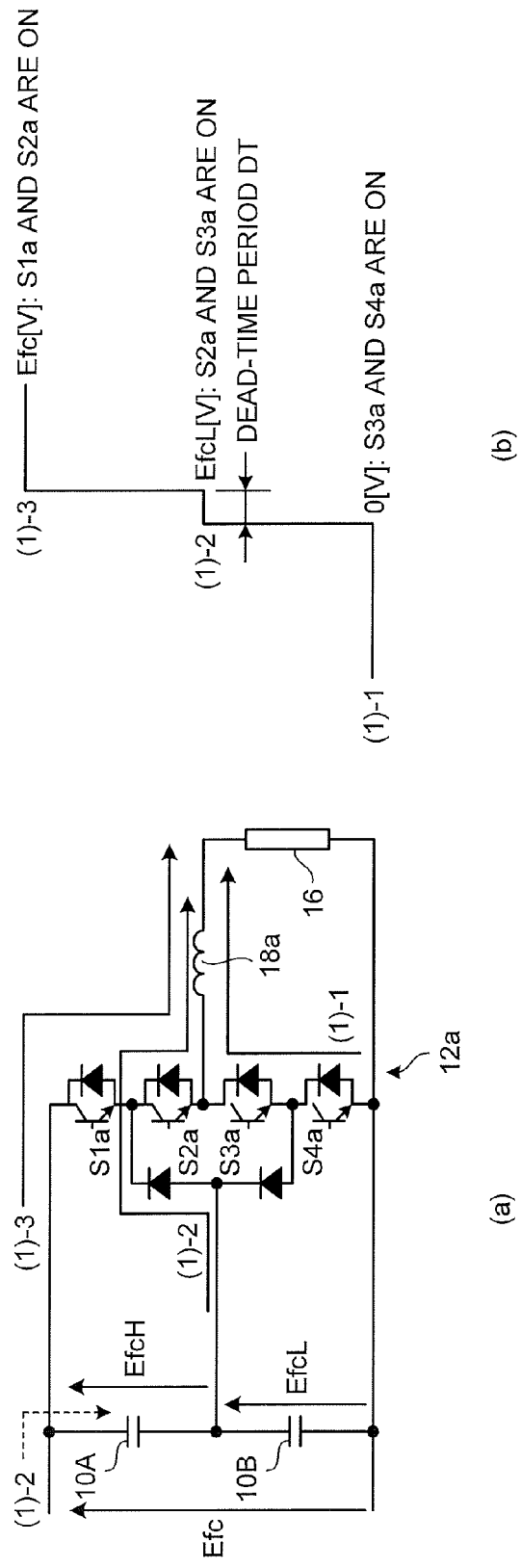
FIG. 4 are diagrams illustrating the cause of generation of a voltage imbalance when charging a battery.

Next, the cause of generation of a voltage imbalance is described with reference to FIGS. 4 to 6. FIG. 4 has diagrams illustrating the cause of generation of a voltage imbalance when charging a battery. FIG. 5 is a diagram illustrating a switching pattern for switching elements of a power conversion phase. FIG. 4(a) only illustrates the power conversion circuit 12a that is a power conversion phase, and it omits illustrations of the power conversion circuit 12b that is an imbalance-reduction phase. FIG. 4(b) illustrates an output-voltage state of the power conversion phase.

When charging the battery 16, the switching elements S3a and S4a are controlled so as to be ON; and the switching elements S1a and S2a are controlled so as to be OFF (see FIG. 5). A charging current to the battery 16 is supplied from the reactor 18a. A current flows to the battery 16 along a path (1)-1.

Next, while the switching elements S1a and S3a remain unchanged, the switching element S2a is switched from OFF to ON, and the switching element S4a is switched from ON to OFF (see FIG. 5). At this time, the current path is a path (1)-2. A charging current to the battery 16 is supplied from the capacitor 10B. A decreased portion of the input voltage is supplied to the capacitor 10A along a path 1-(2), which is illustrated by a dotted line.

Further, while the switching elements S2a and S4a remain unchanged, the switching element S1a is switched from OFF to ON, and the switching element S3a is switched from ON to OFF (see FIG. 5). At this time, the current path is a path (1)-3. A charging current to the battery 16 is supplied from both the capacitors 10A and 10B.

It is assumed from the above operations that the insertion of the operation of (1)-2 for drawing a current only from the capacitor 10B causes an imbalanced state between the low-order-side divided voltage EfcL and the high-order-side divided voltage EfcH, where EfcL<EfcH. As illustrated in FIG. 4(b), the operation of (1)-2 is attributable to a dead-time period DT provided in order to prevent a through-current from flowing between the switching elements S1a to S4a, which are connected in series.

Assuming that the power-conversion circuit unit 2 is the inverter circuit as described in Patent Literature 1, it is possible to eliminate the imbalance by taking advantage of switching between the polarities at each AC cycle. However, given that the power-conversion circuit unit 2 is a DC/DC conversion circuit as described in the present application, no polarity switching is involved therein. Therefore, the amount of imbalance attributable to the dead-time period DT is accumulated and increased. Accordingly, the main purpose of the present application is to provide an imbalance-reduction phase in order to eliminate the imbalance by a method described later.

Figure 6:
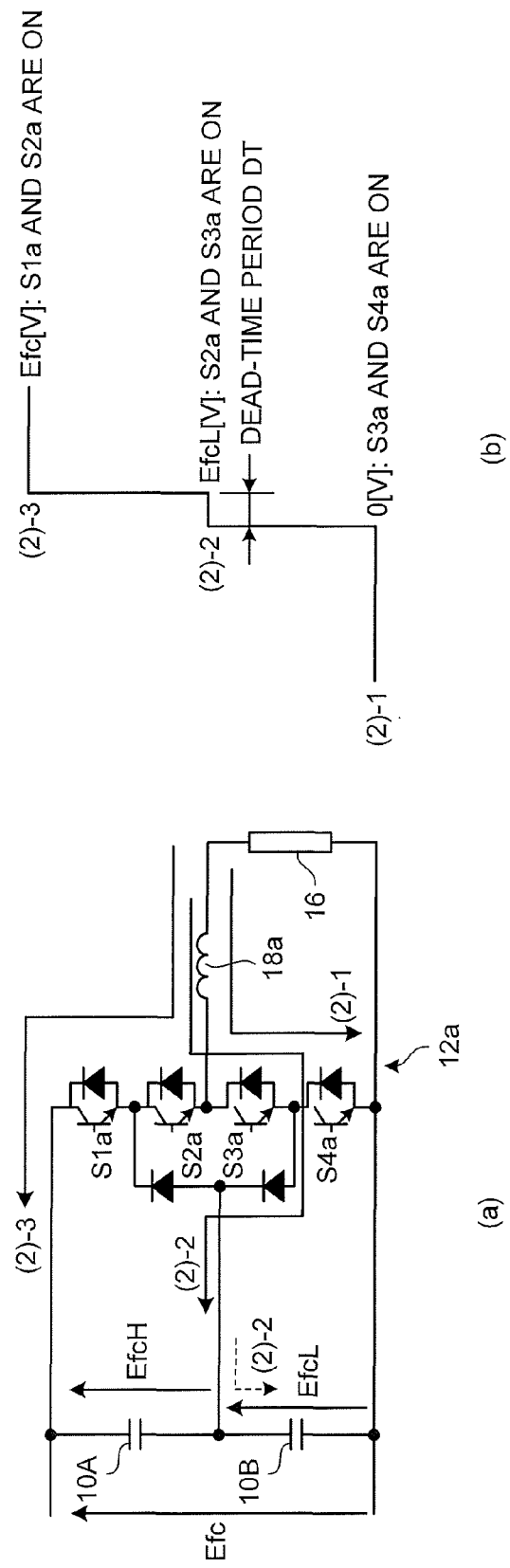
FIG. 6 are diagrams illustrating the cause of generation of a voltage imbalance when discharging a battery.

While FIG. 4 has diagrams illustrating the cause of a voltage imbalance when charging a battery, FIG. 6 has diagrams illustrating the cause of a voltage imbalance when discharging a battery. The switching pattern when discharging a battery is identical to the switching pattern when charging a battery as illustrated in FIG. 5.

When the switching elements S3a and S4a are switched to ON and the switching elements S1a and S2a are switched to OFF, a discharging current from the battery 16 flows along a path (2)-1 and therefore electric energy is stored in the reactor 18a.

Next, while the switching elements S1a and S3a remain unchanged, the switching element S2a is switched from OFF to ON and the switching element S4a is switched from ON to OFF. A discharging current from the battery 16 and the reactor 18a flows along a path (2)-2, and therefore power is supplied to only the capacitor 103.

Further, while the switching elements S2a and S4a remain unchanged, the switching element S1a is switched from OFF to ON and the switching element S3a is switched from ON to OFF. A discharging current from the battery 16 and the reactor 18a then flows along a path (2)-3, and therefore power is supplied to both the capacitors 10A and 10B.

It can be understood from the above operations that the insertion of the operation of (2)-2 for supplying power to only the capacitor 10B causes an imbalanced state between the low-order-side divided voltage EfcL and the high-order-side divided voltage EfcH, where EfcL>EfcH. As illustrated in FIG. 6(b), the operation of (2)-2 is attributable to the dead-time period DT provided in order to prevent a through-current from flowing between the switching elements S1a to S4a, which are connected in series. The cause of the voltage imbalance is the same as when charging a battery.

Figure 7:
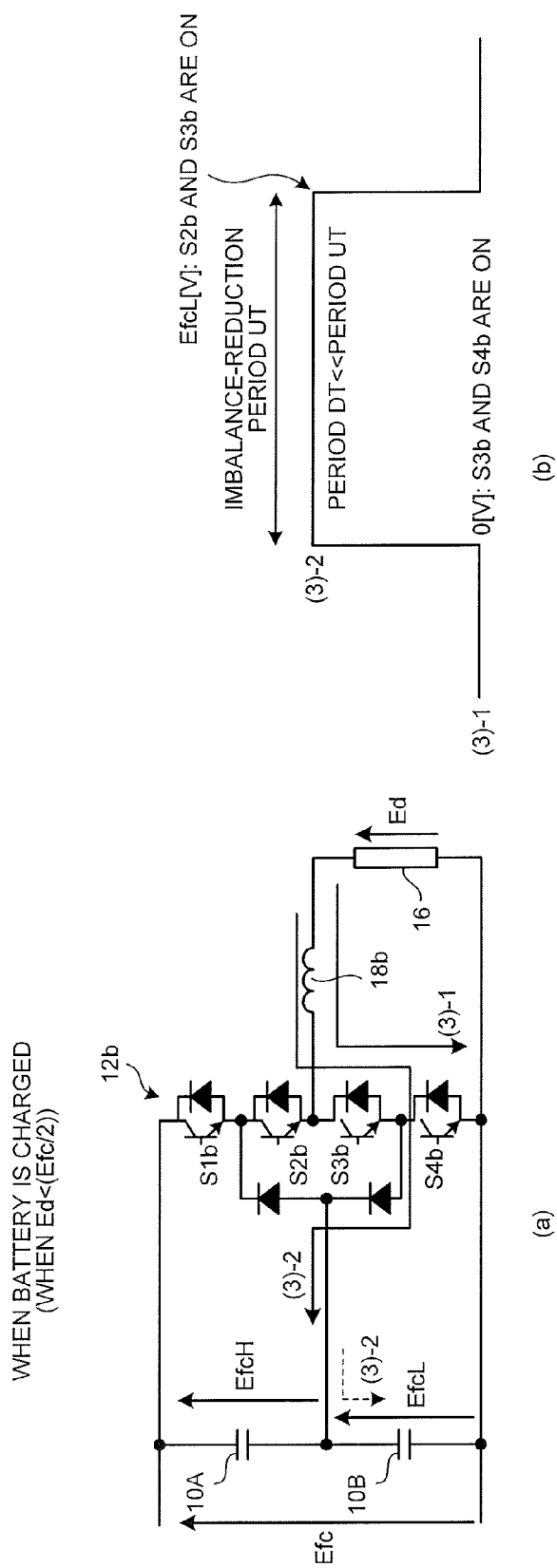
FIG. 7 are explanatory diagrams of the operations of voltage-imbalance-reduction when charging a battery (when Ed<(Efc/2)).

Next, the operations of voltage-imbalance-reduction are described with reference to FIGS. 7 to 11. First, FIG. 7 has explanatory diagrams of the operations of voltage-imbalance-reduction when charging a battery. FIG. 7 illustrates an operation when there is a relation between a battery voltage Ed and a half of the input voltage Efc (Efc/2), which is expressed as "Ed<(Efc/2)". FIG. 8 is a diagram illustrating a switching pattern for switching elements of an imbalance-reduction phase. FIG. 7(a) only illustrates the power conversion circuit 12b that is an imbalance-reduction phase, and it omits illustrations of the power conversion circuit 12a that is a power conversion phase. FIG. 7(b) illustrates an output-voltage state of the imbalance-reduction phase.

As illustrated in FIG. 4 for example, when charging the battery 16, a current from the power conversion circuit 12a that is a power conversion phase is supplied to the battery 16. At this time, the switching elements S1b to S4b are controlled such that a current flows to the power conversion circuit 12b that is an imbalance-reduction phase in a direction of flowing out from the battery 16 (i.e., in a reverse direction to the charging current), as illustrated in FIG. 7.

More specifically, the switching elements S1b and S2b are switched to OFF, and the switching elements S3b and S4b are switched to ON (see the switching pattern on the left side of FIG. 8). At this time, a current path illustrated as a path (3)-1 is formed between the battery 16 and the power conversion circuit 12b.

Next, while the switching elements S1b and S3b remain unchanged, the switching element S2b is switched from OFF to ON, and the switching element S4b is switched from ON to OFF (see FIG. 8). At this time, the current path is a path (3)-2. A current from the battery 16 and the reactor 18b is supplied to only the capacitor 10B, and therefore the voltage of the capacitor 10B is increased.

It can be understood from the above operations that the insertion of the operation of (3)-2 for supplying power only to the capacitor 10B enables the elimination of the imbalanced state when charging a battery, i.e., the imbalanced state where EfcL<EfcH. The period of the operation of 3-(2) is defined as "imbalance-reduction period UT". As illustrated in FIG. 7(b), there is a relation between the imbalance-reduction period UT and the dead-time period DT, which is expressed as "DT<<UT". This relation is described later.

Figure 9:
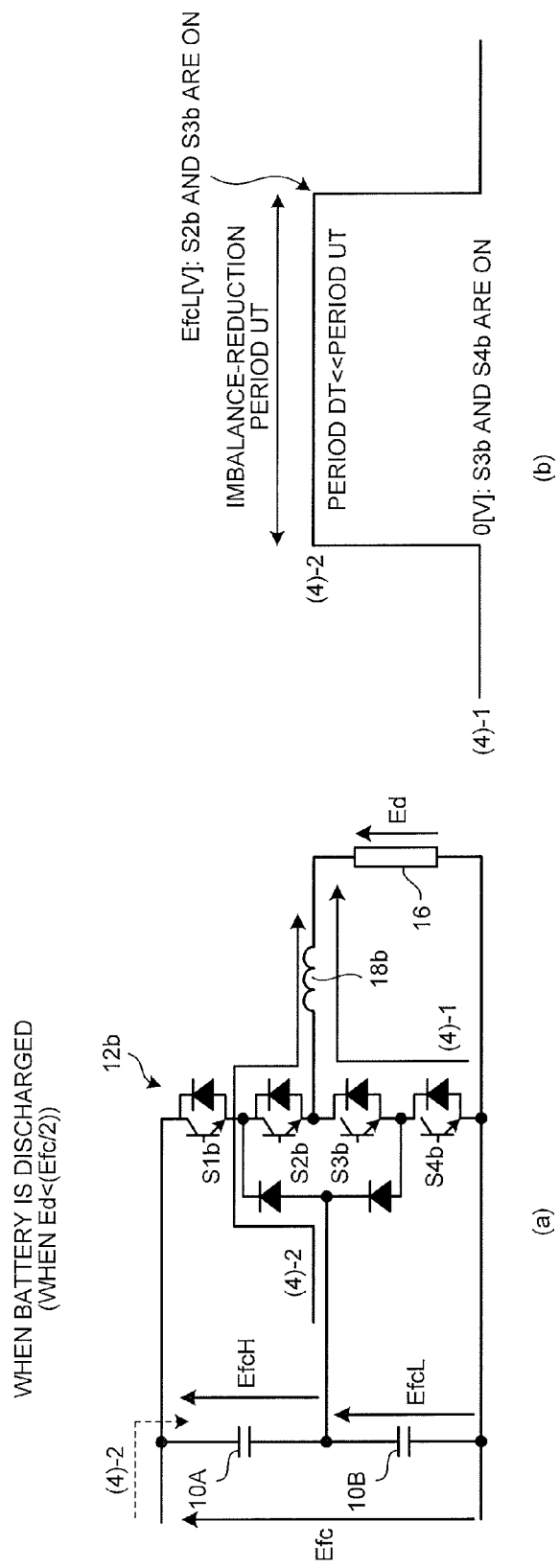
FIG. 9 are explanatory diagrams of the operations of voltage-imbalance-reduction when discharging a battery (when Ed<(Efc/2)).

Next, the operations of voltage-imbalance-reduction when discharging a battery are described. FIG. 9 has explanatory diagrams of the operations of voltage-imbalance-reduction when discharging a battery. Identical to what is shown in FIG. 7, there is a relation between the battery voltage Ed and a half of the input voltage Efc (Efc/2), which is expressed as "Ed<(Efc/2)". A switching pattern for switching elements of an imbalance-reduction phase is identical to the switching pattern when charging a battery.

When discharging the battery 16, as illustrated in FIG. 6 for example, a current flows from the battery 16 through the power conversion circuit 12a that is a power conversion phase toward the capacitors 10A and 10B. At this time, the switching elements S1b to S4b are controlled such that a current flows from the power conversion circuit 12b that is an imbalance-reduction phase in a direction of flowing into the battery 16 (i.e., in a reverse direction to the discharging current), as illustrated in FIG. 9. The order of controlling the switching elements S1b to S4b is identical to the order when charging a battery.

More specifically, the switching elements S1b and S2b are switched to OFF, and the switching elements S1b and S4b are switched to ON (see FIG. 8). At this time, a current path illustrated as a path (4)-1 is formed between the battery 16 and the power conversion circuit 12b.

Next, while the switching elements S1b and S3b remain unchanged, the switching element S2b is switched from OFF to ON, and the switching element S4b is switched from ON to OFF (see FIG. 8). At this time, the current path is a path (4)-2. A current flows in a direction in which the voltage of the capacitor 10B is decreased. A decreased portion of the voltage between both ends of the capacitors 10A and 10B, caused by the decrease in voltage of the capacitor 10B, is compensated for by a current flowing into the capacitor 10A along a path (4)-2, as illustrated by a dotted line.

It can be understood from the above operations that the insertion of the operation of (4)-2 for having a current flow from the capacitor 10B toward the battery 16 enables the elimination of the imbalanced state when discharging a battery, i.e., the imbalanced state where EfcL>EfcH. The period of the operation of 4-(2) functions as the imbalance-reduction period UT which is identical to the time period when a battery is being charged.

Figure 10:
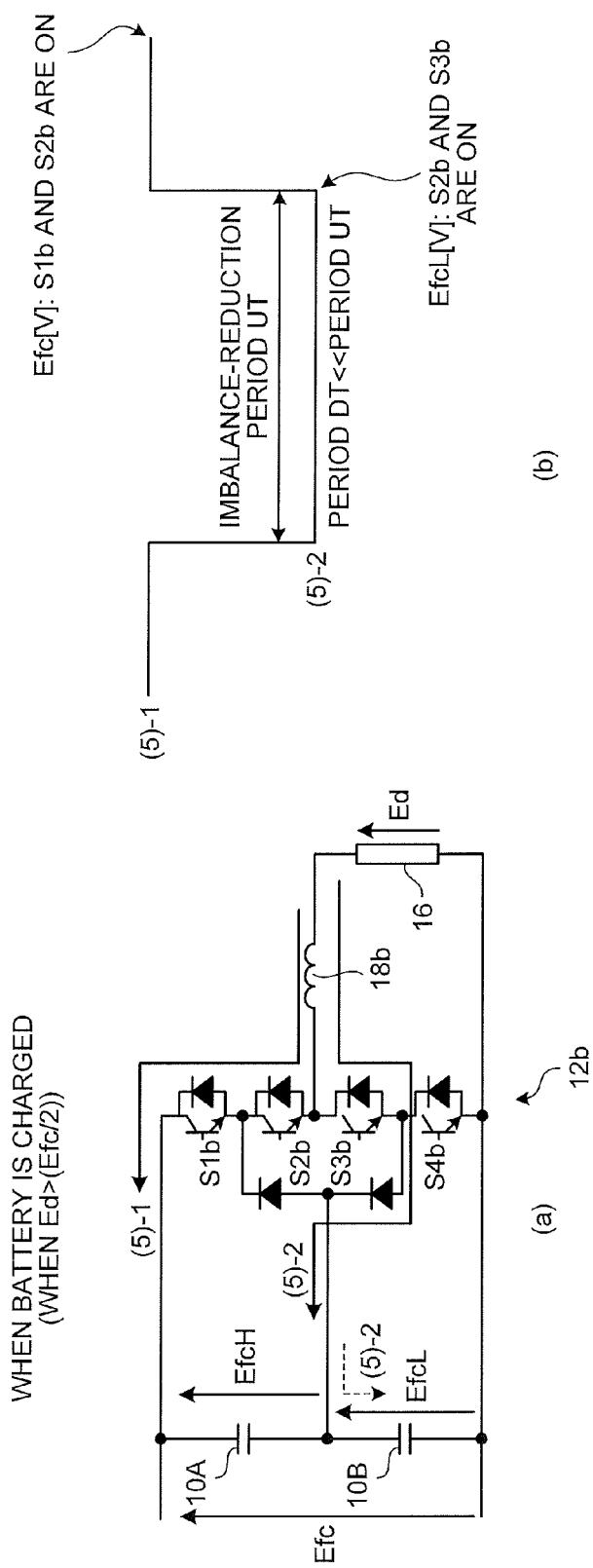
FIG. 10 are explanatory diagrams of the operations of voltage-imbalance-reduction when charging a battery (when Ed>(Efc/2)).

Next, an operation when there is a relation between the battery voltage Ed and a half of the input voltage Efc (Efc/2), which is expressed as "Ed>(Efc/2)", will be described with reference to FIGS. 10 and 11. First, FIG. 10 has explanatory diagrams of the operations of voltage-imbalance-reduction when charging a battery.

As illustrated in FIG. 4, when charging the battery 16, a current from the power conversion circuit 12a that is a power conversion phase is supplied to the battery 16. At this time, the switching elements S1b to S4b are controlled such that a current flows to the power conversion circuit 12b that is an imbalance-reduction phase in a direction of flowing out from the battery 16 (i.e., in the reverse direction to the charging current), as illustrated in FIG. 10.

More specifically, the switching elements S1b and S2b are switched to ON, and the switching elements S3b and S4b are switched to OFF (see the switching pattern on the right side of FIG. 8). At this time, a current path illustrated as a path (5)-1 is formed between the battery 16 and the power conversion circuit 12b, and therefore a current flows to both the capacitors 10A and 10B.

Next, while the switching elements S2b and S4b remain unchanged, the switching element S1b is switched from ON to OFF and the switching element S3b is switched from OFF to ON (see FIG. 8). At this time, the current path is a path (5)-2. A current from the battery 16 and the reactor 18b is supplied to only the capacitor 10B, and therefore the voltage of the capacitor 103 is increased.

It is assumed from the above operations that the insertion of the operation of (5)-2 for supplying power to only the capacitor 10B enables the elimination of the imbalance state when charging a battery, i.e., the imbalance state where EfcL<EfcH. The period of the operation of 5-(2) functions as the imbalance-reduction period UT similar to the above case.

Figure 11:
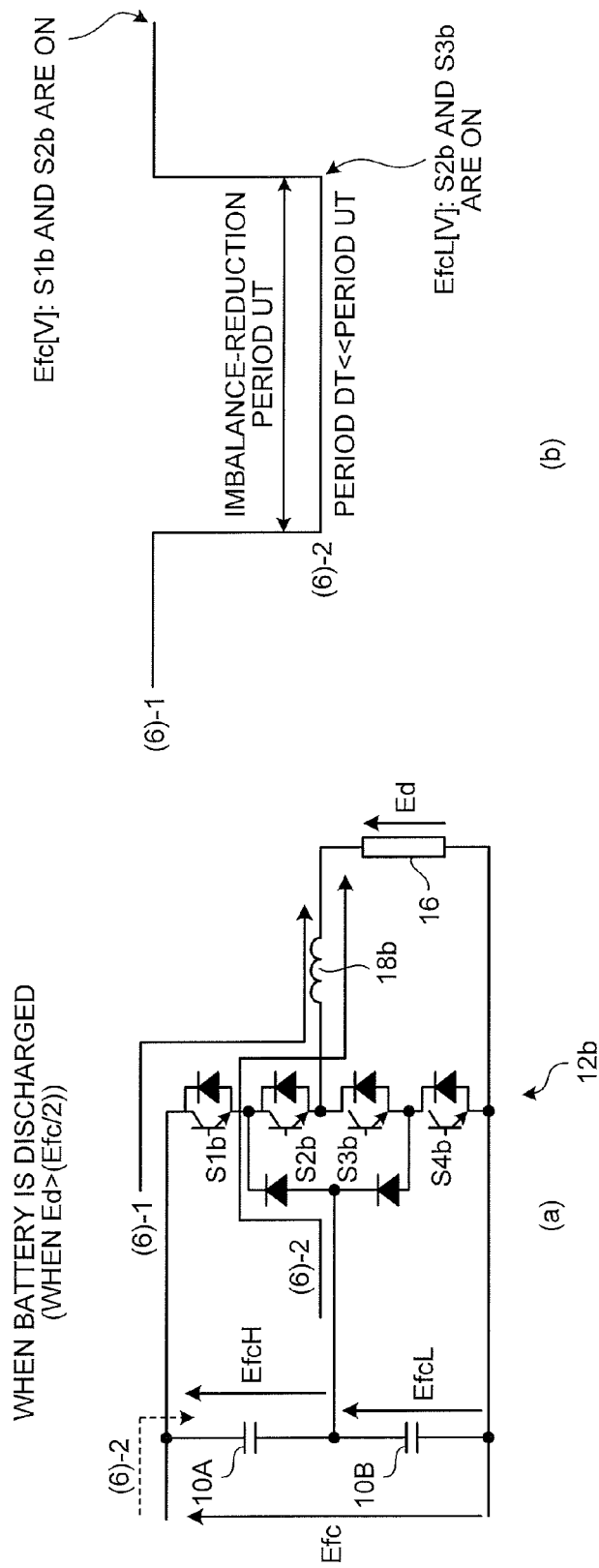
FIG. 11 are explanatory diagrams of the operations of voltage-imbalance-reduction when discharging a battery (when Ed>(Efc/2)).

FIG. 11 has explanatory diagrams of the operations of voltage-imbalance-reduction when discharging a battery. When discharging the battery 16, as illustrated in FIG. 6, a current flows from the battery 16 through the power conversion circuit 12a that is a power conversion phase toward the capacitors 10A and 10B. At this time, the switching elements S1b to S4b are controlled such that a current flows from the power conversion circuit 12b that is an imbalance-reduction phase in a direction of flowing into the battery 16 (i.e., in the reverse direction to the discharging current), as illustrated in FIG. 11. The order of controlling the switching elements S1b to S4b is identical to the order when discharging a battery.

More specifically, the switching elements S1b and S2b are switched to ON, and the switching elements S3b and S4b are switched to OFF (see FIG. 8). At this time, a current path illustrated as a path (6)-1 is formed between the battery 16 and the power conversion circuit 12b.

Next, while the switching elements S2b and S4b remain unchanged, the switching element S1b is switched from ON to OFF and the switching element S3b is switched from OFF to ON (see FIG. 8). At this time, the current path is a path (6)-2. A current flows in a direction in which the voltage of the capacitor 10B is decreased. A decreased portion of the voltage between both ends of the capacitors 10A and 10B, caused by the decrease in voltage of the capacitor 10B, is compensated for by a current flowing into the capacitor 10A along a path (6)-2 illustrated by a dotted line.

It is can be understood from the above operations that the insertion of the operation of (6)-2 for having a current flow from the capacitor 10B toward the battery 16 enables the elimination of the imbalanced state when discharging a battery, i.e., the imbalanced state where EfcL>EfcH. The period of the operation of 6-(2) functions as the imbalance-reduction period UT similar to the above cases.

Figure 12:
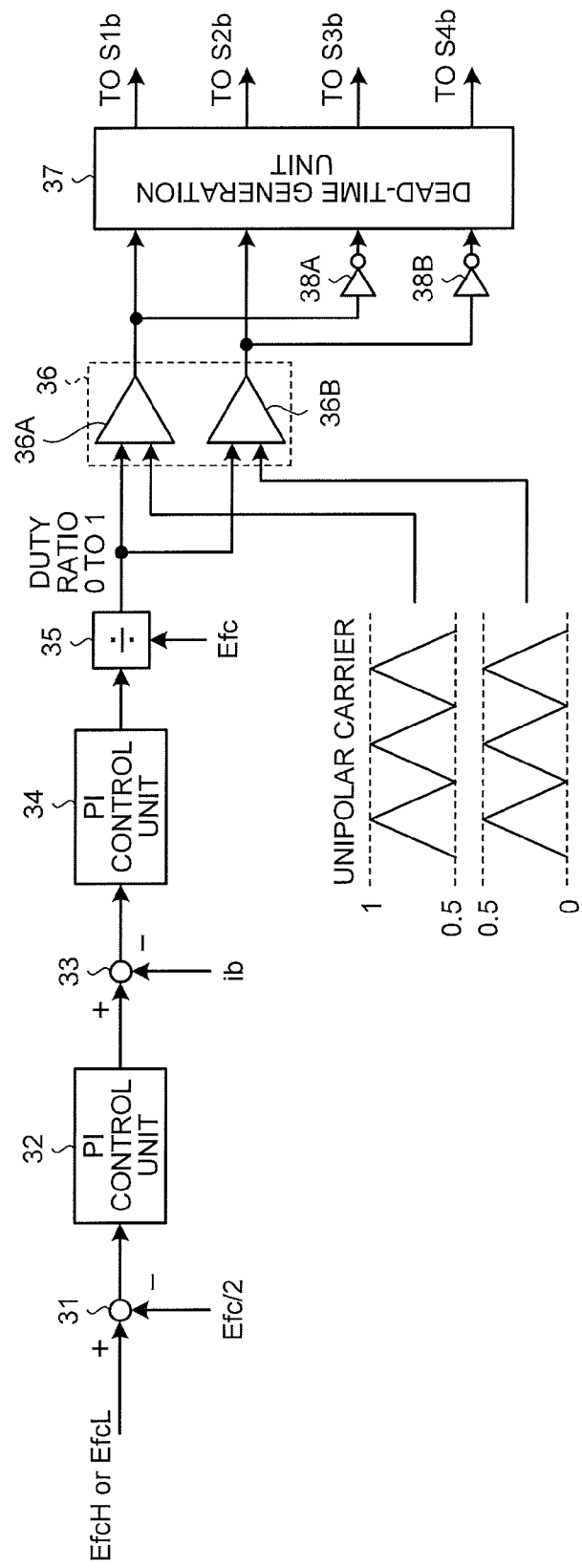
FIG. 12 is a diagram illustrating a configuration example of an imbalance-reduction control unit.

FIG. 12 is a diagram illustrating an example configuration of an imbalance-reduction control unit. FIG. 12 illustrates an example for achieving the switching pattern for an imbalance-reduction phase illustrated in FIG. 8. As illustrated in FIG. 12, the imbalance-reduction control unit can, for example, be a configuration of adder-subtractors 31 and 33, PI control units 32 and 34, a divider 35, a carrier comparison unit 36 including comparators 36A and 36B, a dead-time generation unit 37, and inverting circuits 38A and 38B.

An operation of the circuit in FIG. 12 is described here. In the adder-subtractor 31, a difference in value between Efc/2 (a half of the voltage Efc) and either EfcH or EfcL is calculated and is input to the PI control unit 32. Therefore, in the PI control unit 32, a value related to voltage imbalance is generated. In the adder-subtractor 33, a difference in value between an output of the PI control unit 32 and the imbalance reduction current ib is calculated and is input to the PI control unit 34. An output of the PI control unit 34 is normalized on the basis of the Efc value by the divider 35, and the normalized value is input as a duty ratio (a value ranging between 0 and 1) to the carrier comparison unit 36. The carrier comparison unit 36 performs a comparison operation between two unipolar carriers with a reference duty ratio of 0.5 (FIG. 12 illustrates a first triangular wave that changes between 0.5 and 1, and a second triangular wave that changes between 0 and 0.5, as an example). Respective outputs of the comparators 36A and 36B in the carrier comparison unit 36 are separated into four signals made up of inverted signals passing through the inverting circuits 38A and 38B and non-inverted signals not passing through the inverting circuits 38A and 38B. These four signals are input to the dead-time generation unit 37. In the dead-time generation unit 37, a dead time is assigned to switching signals. The switching signals assigned with a dead time are output to the switching elements S1b to S4b of an imbalance reduction phase.

Figure 13:
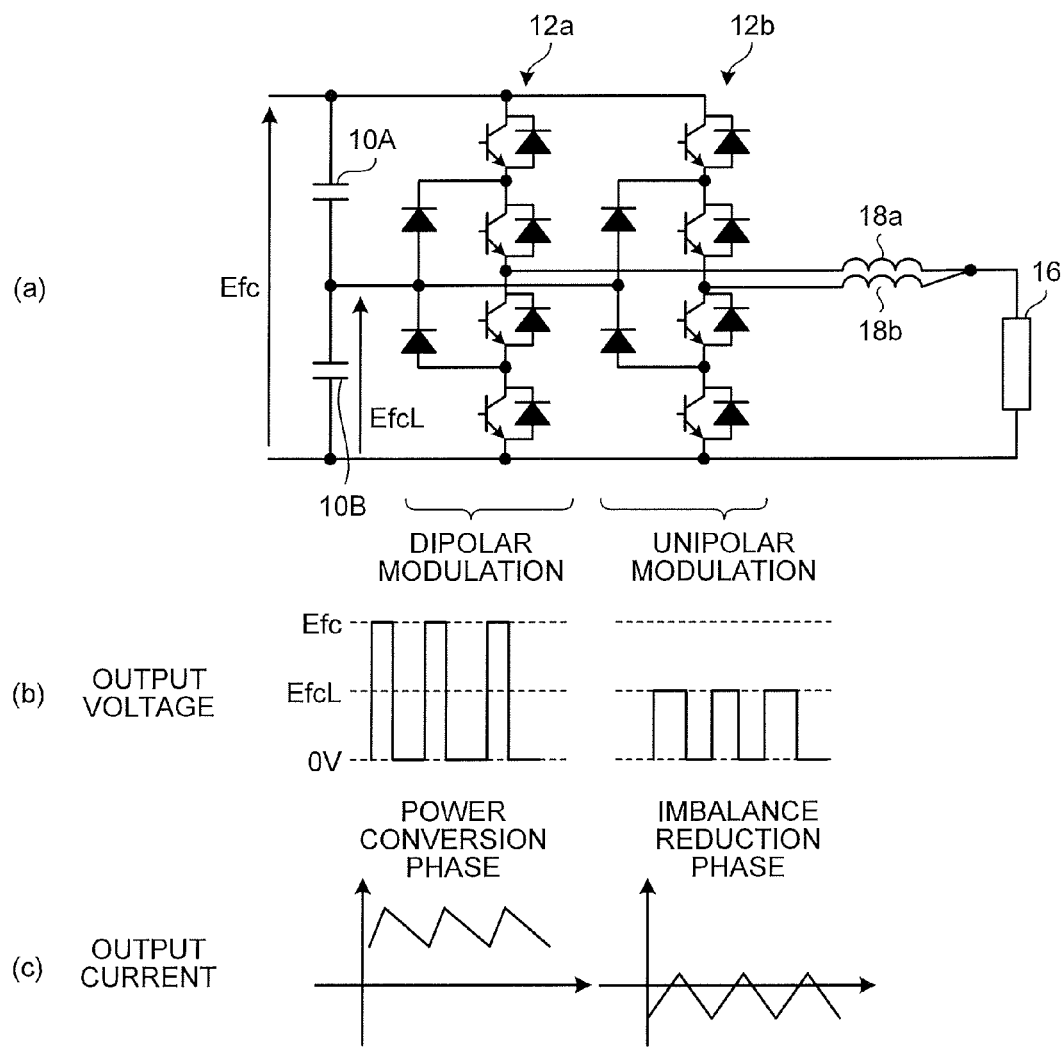
FIG. 13 are diagrams illustrating an operation waveform in the DC/DC conversion device according to the first embodiment.

FIG. 13 has diagrams illustrating an operation waveform in the DC/DC conversion device according to the first embodiment. FIG. 13(b) illustrates an output-voltage waveform. FIG. 13(c) illustrates an output-current waveform.

As described above, the direction of a current flowing through the power conversion circuit 12a that is a power conversion phase to the reactor 18a and the direction of a current flowing through the power conversion circuit 12b that is an imbalance-reduction phase to the reactor 18b are opposite to each other. When these currents are equal in magnitude, the current flowing to the reactor 18a only flows to the reactor 18b, and therefore the battery 16 cannot be charged and discharged.

However, with the DC/DC conversion device according to the first embodiment, this hindrance as described above is eliminated by using different modulation methods for the power conversion phase and for the imbalance-reduction phase. Specifically, as illustrated in FIG. 13(b), dipolar modulation is performed on the power conversion circuit 12a that is a power conversion phase, and unipolar modulation is performed on the power conversion circuit 12b that is an imbalance reduction phase. As described above, the imbalance-reduction period UT can be made sufficiently longer than the dead-time period DT. With these control modes, as illustrated in FIG. 13(c), while a higher output current can be obtained from the power conversion phase, a lower output current can be obtained from the imbalance-reduction phase. This makes it possible to have a differential current flow into/out of the battery 16.

Because a greater amount of current flows through the power conversion phase than that through the imbalance reduction phase, the power conversion phase tends to be hotter. However, switching between the power conversion phase and the imbalance-reduction phase according to the driving state can make heat generation uniform in the power-conversion circuit unit. The uniform heat generation also extends the lifespan of the power-conversion circuit unit.

Figure 14:
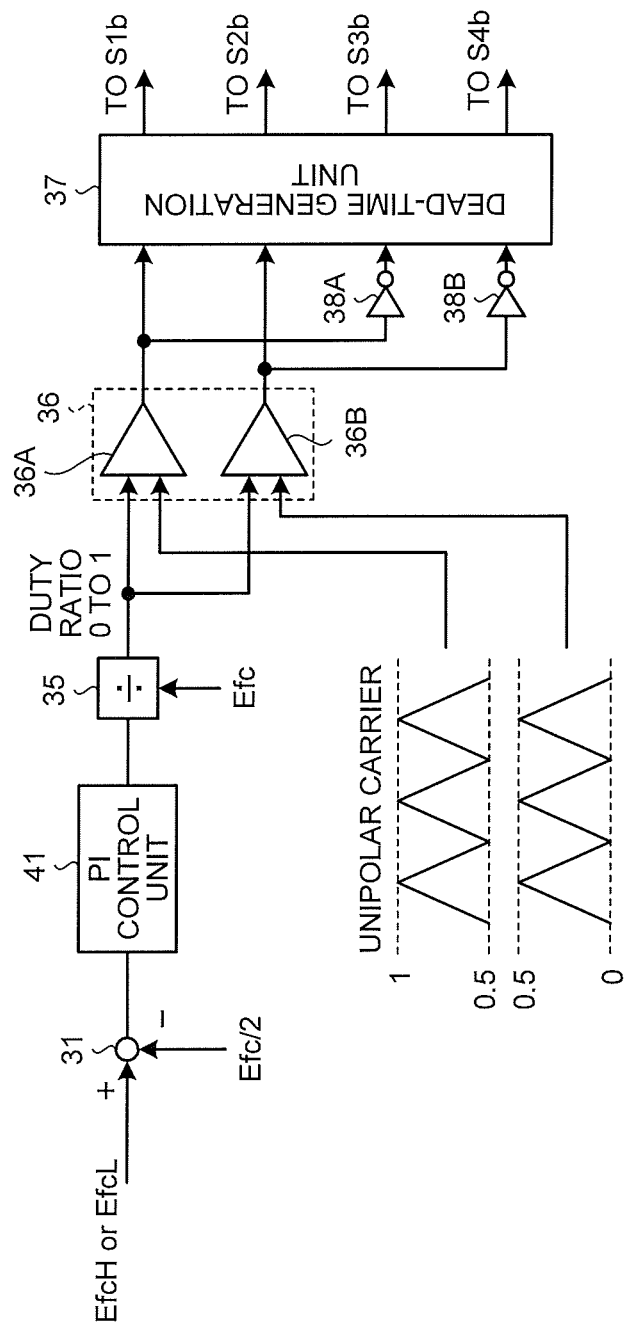
FIG. 14 is a diagram illustrating a configuration example of an imbalance-reduction control unit different in configuration from that of FIG. 12.

FIG. 14 is a diagram illustrating an example configuration of an imbalance-reduction control unit that has a different configuration from that of FIG. 12. FIG. 14 illustrates a configuration of an imbalance-reduction control unit that does not use a current detector.

In the configuration illustrated in FIG. 14, the PI control unit 32 and the adder-subtractor 33 are omitted from FIG. 12, and a PI control unit 41 is included instead of the PI control unit 34. That is, the PI control unit 41 may be configured to generate a control amount, which is the base of the duty ratio, by using a difference in value between Efc/2 and either EfcH or EfcL.

As described above, in the DC/DC conversion device according to the first embodiment, at least one of the phases of three-level power conversion circuits is configured to operate as an imbalance-reduction phase that executes imbalance-reduction control such that either one of EfcH and EfcL is divided into a value that is half of the input DC voltage. Therefore, even when the three-level power conversion circuits are applied to DC/DC conversion, variations in potential at the neutral point can be reduced.

In the first embodiment, there has been described a control operation for operating one of the phases of the three-level power conversion circuits as an imbalance-reduction phase, and for operating the remaining two phases as a power conversion phase. However, this relation can be reversed. For example, with a three-level power conversion circuit when there is already a lineup of three-phase power conversion circuits and the battery 16 that is a DC load has a low capacity, then it can be configured such that two of the three phases are operated as an imbalance reduction phase, and the remaining one phase is operated as a power conversion phase. While in the above descriptions, the battery 16 is used as a DC load, for example, the DC load is not necessarily a battery.

Second Embodiment

Figure 15:
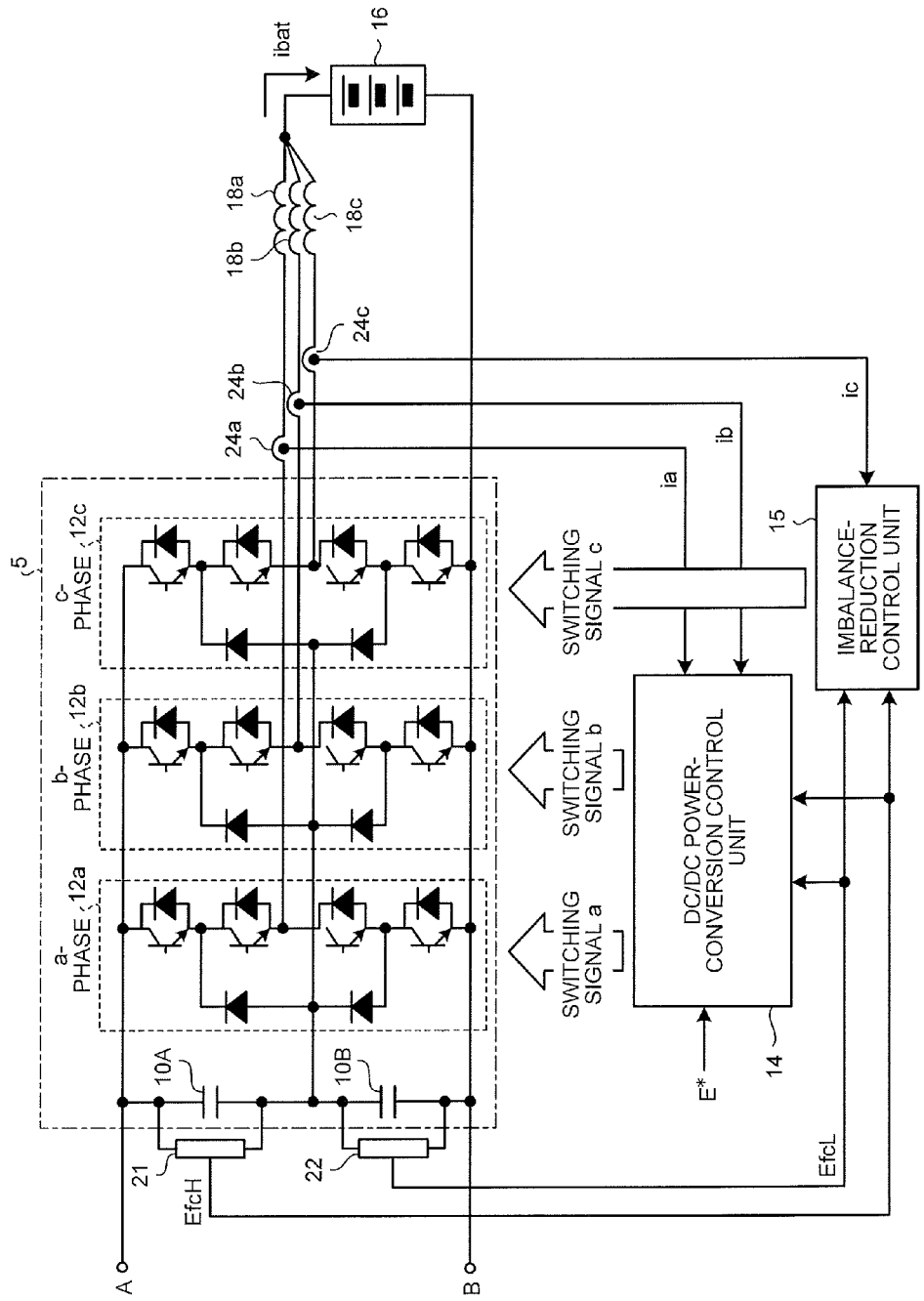
FIG. 15 is a diagram illustrating a configuration of a DC/DC conversion device according to a second embodiment.

FIG. 15 is a diagram illustrating a configuration of a DC/DC conversion device according to a second embodiment. Constituent elements identical or equivalent to those illustrated in FIG. 1 are denoted by like reference signs. In the DC/DC conversion device illustrated in FIG. 1, the power conversion circuit 12a (the a-phase) is configured as a power conversion phase, and the power conversion circuit 12b (the b-phase) is configured as an imbalance-reduction phase. In the present embodiment, as illustrated in FIG. 15, when a three-phase main circuit 5 including three power conversion circuits is configured, the power conversion circuits 12a and 12b (the a-phase and the b-phase) are configured as a power conversion phase, and a power conversion circuit 12c (a c-phase) is configured as an imbalance-reduction phase. At an output terminal of the power conversion circuit 12c, a reactor 18c is provided. Due to this configuration, in addition to the command value E*, voltages detected respectively by the voltage detectors 21 and 22, and currents detected respectively by the current detectors 24a and 24b, are input to the DC/DC power-conversion control unit 14. The configuration in FIG. 2 is used for the arrangement of the voltage detectors 21 and 22. Voltages detected respectively by the voltage detectors 21 and 22, and a current detected by a current detector 24c, are input to the imbalance-reduction control unit 15.

Figure 16:
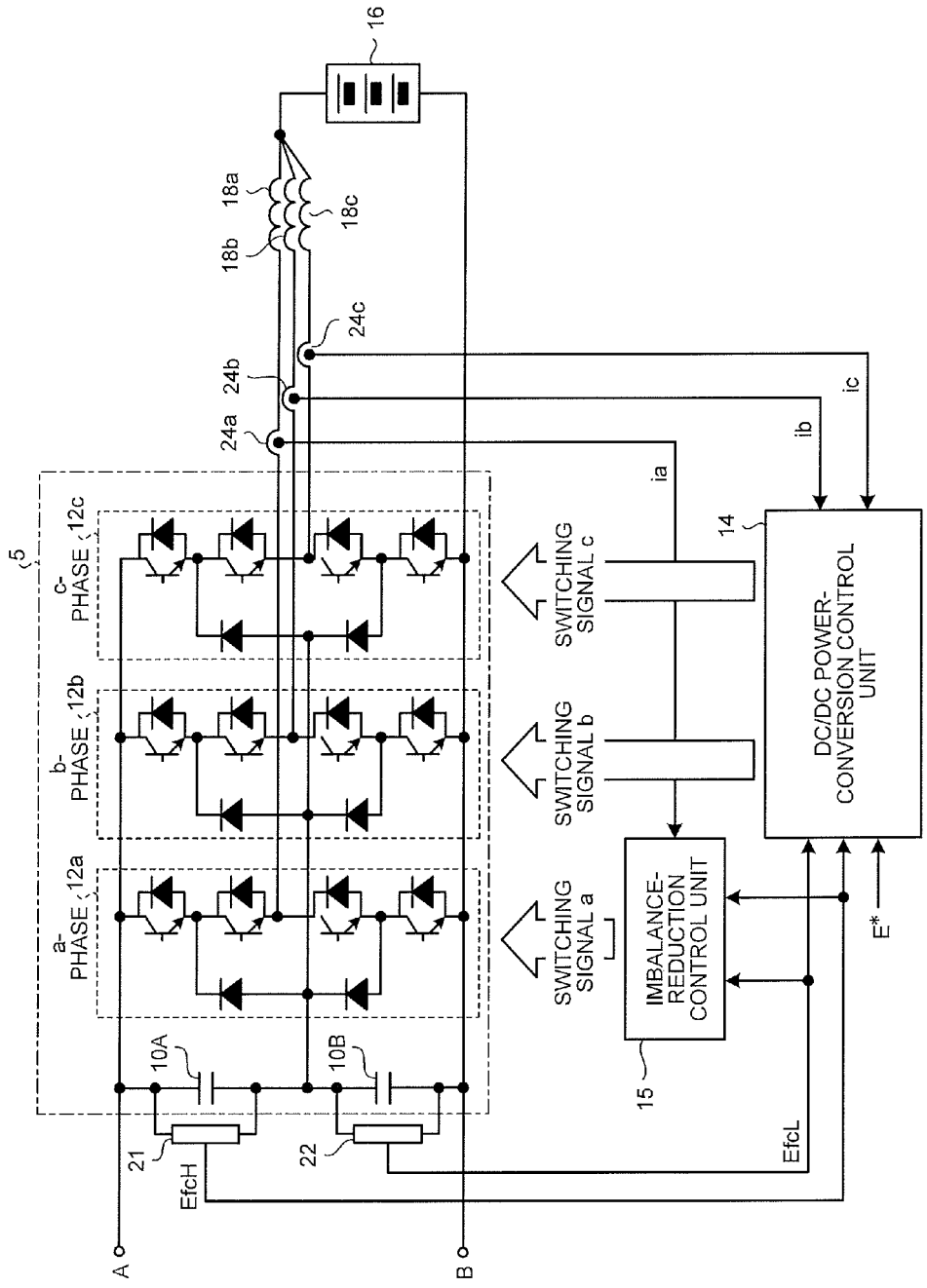
FIG. 16 is a diagram illustrating an example of the DC/DC power conversion device illustrated in FIG. 15, in which the functions of phases are interchanged.

FIG. 16 is a diagram illustrating an example of the DC/DC power conversion device illustrated in FIG. 15, in which functions of phases are interchanged. The power conversion circuit 12a functioning as a power conversion phase in FIG. 15 functions as an imbalance-reduction phase herein. The power conversion circuit 12c functioning as an imbalance-reduction phase in FIG. 15 functions as a power conversion phase herein. While in FIGS. 15 and 16, the function of the power conversion circuit 12b remains unchanged, it is apparent that the function of this circuit can be changed. As also described in the first embodiment, in a power conversion circuit that operates as a power conversion phase, an output current is higher, and therefore a current flowing to switching elements is also higher than those in a power conversion circuit that operates as an imbalance-reduction phase. Accordingly, the lifespan of the power conversion circuit that operates as a power conversion phase is considered to be shorter. Meanwhile, as described in the second embodiment, the function of each phase is appropriately interchanged between a power conversion phase and an imbalance-reduction phase, and consequently the power conversion circuits have a uniform lifespan.

Figure 17:
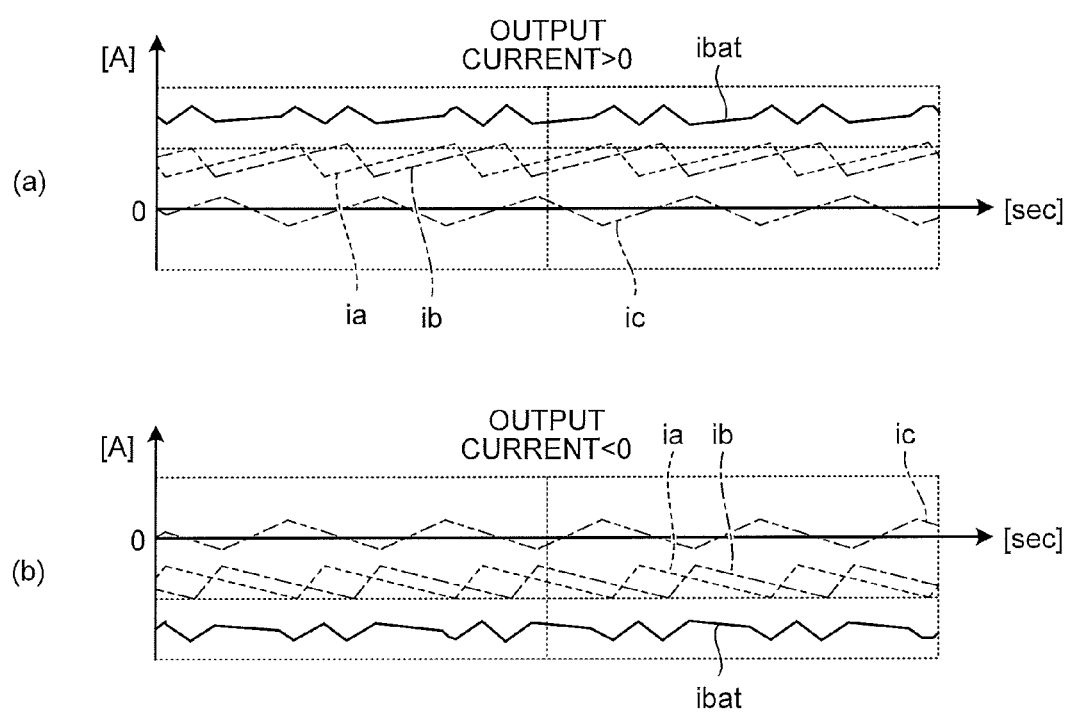
FIG. 17 are diagrams illustrating an example of operation waveforms in the DC/DC conversion device according to the second embodiment.

FIG. 17 are diagrams illustrating an example of operation waveforms in the DC/DC conversion device according to the second embodiment. In this operation example, in order to displace the phases of respective-phase carrier waves from each other, a phase difference is provided to the carrier waves. In FIG. 17, the dotted line represents an a-phase current, the dot-and-dash line represents a b-phase current, and the chain double-dashed line represents a c-phase current. Also, the solid line represents a battery current ibat to the battery 16 (a direction for charging the battery 16 is defined as positive). FIG. 17($a$) shows waveforms when an output current is positive (output current>0). FIG. 17($b$) shows waveforms when an output current is negative (output current<0).

As illustrated in FIG. 17($a$), the phase of a c-phase carrier wave that operates as an imbalance-reduction phase is displaced from the respective phases of the a-phase and b-phase carrier waves that operate as a power conversion phase. This makes it possible to reduce a ripple of the battery current ibat. This also applies to FIG. 17($b$) illustrating a negative output current.

As described above, in the DC/DC conversion device according to the second embodiment, one of a plurality of three-level power conversion circuits is used as a three-level power conversion circuit that operates as an imbalance-reduction phase by switching between these power conversion circuits. Therefore, the power conversion circuit, which operates as an imbalance-reduction phase along with the remaining power conversion circuits that operate as a power conversion phase, can have a uniform lifespan.

When the DC/DC conversion device according to the second embodiment is operated, it is preferable to displace the phase of a carrier wave for controlling a three-level power conversion circuit that operates as an imbalance-reduction phase from the phase of a carrier wave for controlling a three-level power conversion circuit that operates as a power conversion phase. This control can reduce a ripple of an output current.

Third Embodiment

Figure 18:
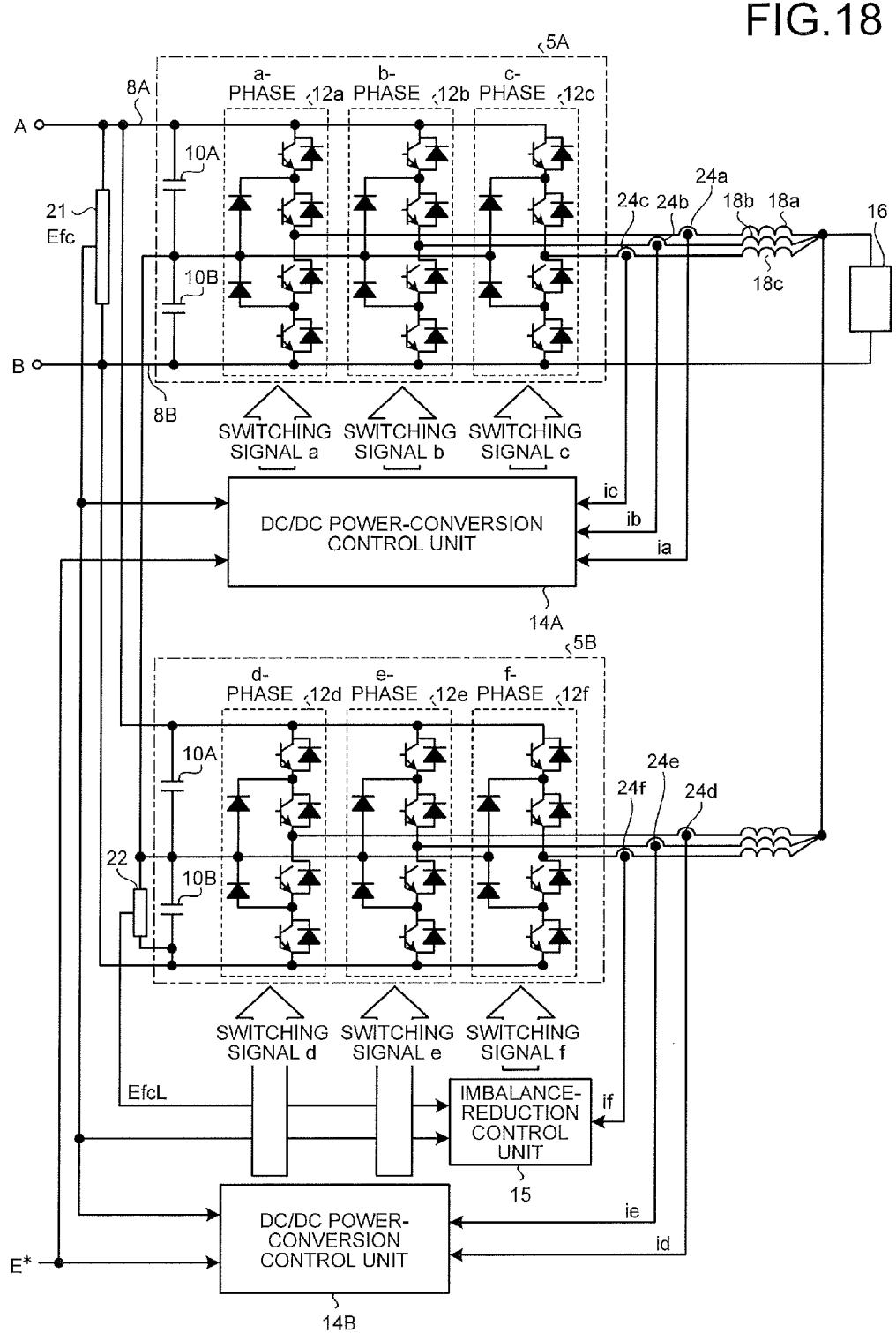
FIG. 18 is a diagram illustrating a configuration of a DC/DC conversion device according to a third embodiment.

FIG. 18 is a diagram illustrating a configuration of a DC/DC conversion device according to a third embodiment. FIG. 18 illustrates a multi-phase configuration in which two three-phase main circuits 5A and 5B are used for the battery 16 that is a DC load. Constituent elements identical or equivalent to those illustrated in FIG. 15 are denoted by like reference signs.

As illustrated in FIG. 18, the three-phase main circuits 5A and 5B are connected on their input side to the DC bus-bars 8A and 8B in parallel, and they are connected on their output side to the battery 16 in parallel. Respective potentials (a high potential, an intermediate potential, and a zero potential) in respective intermediate potential portions of the three-phase main circuits 5A and 5B are wired. As described above, the respective intermediate potential portions of the three-phase main circuits 5A and 5B are electrically connected, and their neutral points are also electrically connected to each other. Therefore, there may be two voltage detectors at most similar to the first and second embodiments.

In FIG. 18, all the power conversion circuits 12a to 12c (the a-phase to the c-phase) that constitute the three-phase main circuit 5A operate as a power conversion phase. In contrast, among power conversion circuits 12*d* to 12*f* (a d-phase to an f-phase) that constitute the three-phase main circuit 5B, the power conversion circuits 12*d* and 12*e* (the d-phase and the e-phase) are configured as a power conversion phase; and the power conversion circuit 12*f* (the f-phase) is configured as an imbalance-reduction phase. Therefore, in the DC/DC conversion device according to the third embodiment, five phases (the a-phase to the e-phase) are configured as a power conversion phase, and one phase (the f-phase) is configured as an imbalance-reduction phase.

Due to the above configuration, the command value E*, the voltage (Efc) detected by the voltage detector 21, and currents (ia to ic) detected respectively by the current detectors 24*a* to 24*c* are input to a DC/DC power-conversion control unit 14A that controls the three-phase main circuit 5A. Further, the command value E*, the voltage (Efc) detected by the voltage detector 21 and currents (id and ie) detected respectively by current detectors 24*d* and 24*e* are input to a DC/DC power-conversion control unit 14B that controls the power conversion circuits 12*d* and 12*e* that are power conversion phases in the three-phase main circuit 5B. Furthermore, the voltages (Efc and EfcL) detected respectively by the voltage detectors 21 and 22 and a current (if) detected by a current detector 24*f* are input to the imbalance-reduction control unit 15 that controls the power conversion circuit 12*f* that is an imbalance-reduction phase in the three-phase main circuit 5B.

Because the DC/DC conversion device according to the third embodiment is configured as described above, it is possible to increase the capacitance of the DC/DC conversion device without unnecessarily increasing the number of imbalance-reduction phases. Further, because identical three-phase main circuits can be used, it is possible to minimize the differences in characteristics between the parallel circuits. Furthermore, because a voltage detector can be shared between the parallel circuits, even when the capacitance is increased, a cost reduction can still be achieved.

While the third embodiment has exemplified the configuration of connecting two three-phase main circuits in parallel, it is possible to connect three or more three-phase main circuits in parallel. For example, when three three-phase main circuits are connected in parallel, one phase of one of the three-phase main circuits operates as an imbalance-reduction phase, and the remaining eight phases operate as a power conversion phase. Also in this configuration, it can be configured such that the function as an imbalance-reduction phase is realized by a single power conversion circuit in any of the three-phase main circuits. That is, in any of the configurations, the sum of the number of power conversion circuits (the number of phases) that operate as an imbalance-reduction phase and the number of power conversion circuits (the number of phases) that operate as a power conversion phase is a number of multiples of 3.

The third embodiment has exemplified the configuration of operating the power conversion circuit 12*f* in the three-phase main circuit 5B as an imbalance-reduction phase. However, as described in the first embodiment, it can be configured such that the power conversion circuit 12*f* is switched to another power conversion circuit to operate as an imbalance-reduction phase according to the driving state.

Fourth Embodiment

Figure 19:
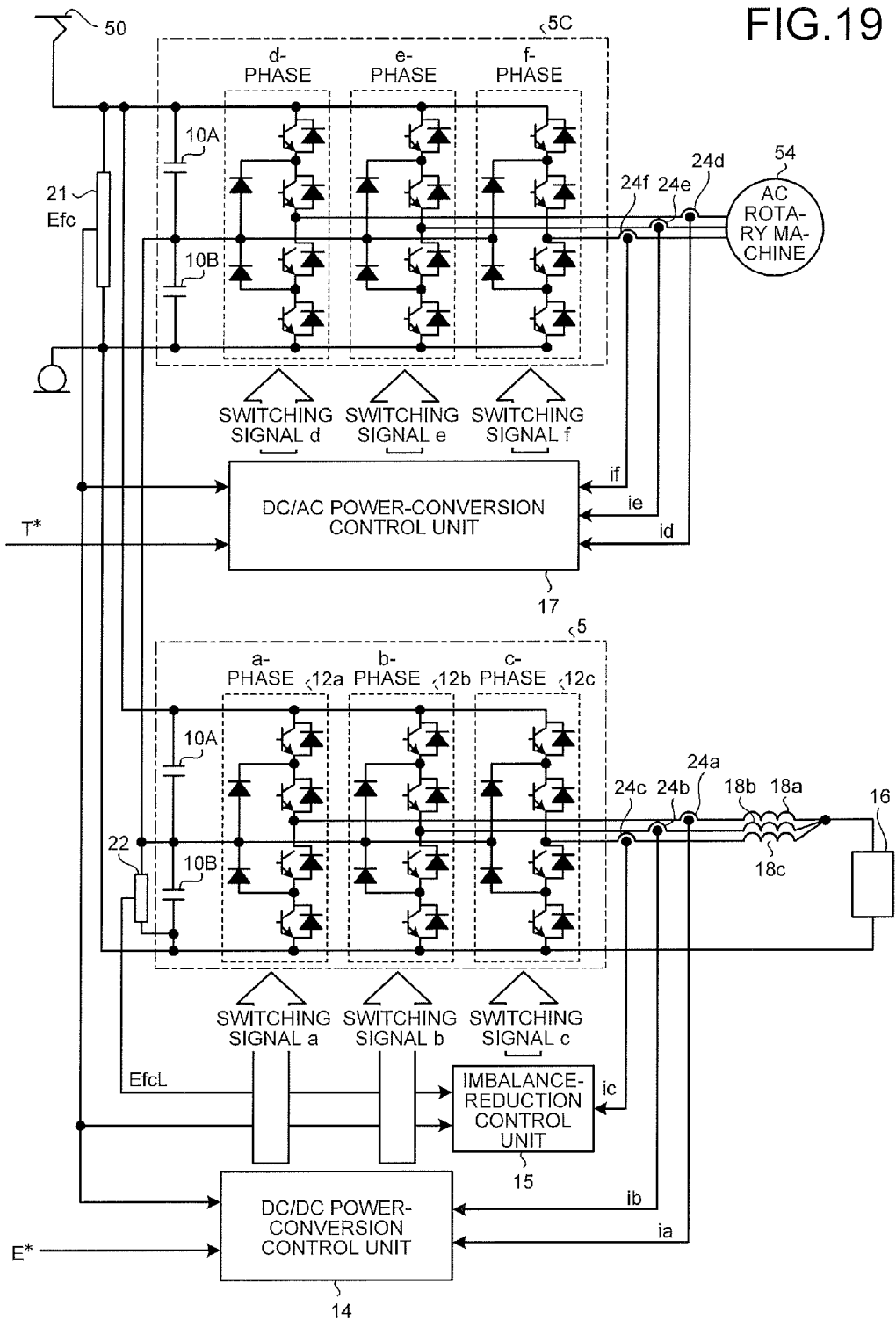
FIG. 19 is a diagram illustrating a modified example of a DC/DC conversion device according to a fourth embodiment.

FIG. 19 is a diagram illustrating a modified example of a DC/DC conversion device according to a fourth embodiment. FIG. 19 illustrates a configuration example as a modified example in the field of electric railway, in which the DC/DC conversion device according to the first and second embodiments is used in a load-drive control system that obtains DC power from a DC overhead wire 50 in order to drive or control an AC rotary machine 54 that is an AC load. Because the configuration of the lower part of FIG. 19 is identical or equivalent to the configuration in FIG. 15, constituent elements thereof are denoted by like reference signs, and redundant explanations thereof will be omitted. The arrangement of the voltage detectors 21 and 22 is different from that in FIG. 15, and the configuration in FIG. 1 is used.

On the upper part of FIG. 19, a three-phase main circuit 5C is provided, which is configured identical to the three-phase main circuit 5 in the DC/DC conversion device. The three-phase main circuit 5C operates as a DC/AC conversion device (an inverter device) that generates AC power for driving the AC rotary machine 54. The three-phase main circuits 5 and 5C are connected in parallel, and their neutral points are electrically connected to each other.

A torque command T*, the voltage (Efc) detected by the voltage detector 21 and the currents (id to if) detected respectively by the current detectors 24*d* to 24*f* are input to a DC/AC power-conversion control unit 17 that controls the three-phase main circuit 5C. The DC/AC power-conversion control unit 17 generates switching signals "d" to "f" for controlling switching elements of the three-phase main circuit 5C, and it outputs them to the three-phase main circuit 5C.

When driving the AC rotary machine 54 at low speed, in the technique described in Patent Literature 1, it is presumed that a response to the imbalance-reduction control cannot satisfy a desired value, which makes it difficult to reduce the voltage imbalance. Meanwhile, as described in the fourth embodiment, the neutral point of the three-phase main circuit 5 on the side of the battery 16 and the neutral point of the three-phase main circuit 5C on the side of the AC rotary machine 54 are electrically connected. Also, imbalance-reduction control in the three-phase main circuit 5C on the side of the AC rotary machine 54 is executed by an imbalance-reduction phase in the three-phase main circuit 5 on the side of the battery 16. Therefore, it is possible to execute imbalance-reduction control on the three-phase main circuit 5C with a desired control response.

According to the modified example of the DC/DC conversion device of the fourth embodiment, the AC rotary machine 54 can be driven by power of the battery 16. Accordingly, it is possible to continue driving even for an unexpected power outage; and driving on a railway track with no overhead wire is also possible.

According to the modified example of the DC/DC conversion device of the fourth embodiment, the AC rotary machine 54 can be driven by power of the battery 16. Thus, it is possible to continue driving even at an unexpected power outage.

Further, according to the modified example of the DC/DC conversion device of the fourth embodiment, a voltage detector can be shared between parallel circuits, and also identical three-phase main circuits can be used. Therefore, it is possible to reduce manufacturing costs and management costs.

Furthermore, according to the modified example of the DC/DC conversion device of the fourth embodiment, identical three-phase main circuits can be used between DC/AC conversion devices, between DC/DC conversion devices, and between a DC/AC conversion device and a DC/DC conversion device. Therefore, the number of the AC rotary machines 54 driven and the capacity of the battery 16 can both be increased easily.

Fifth Embodiment

Figure 20:
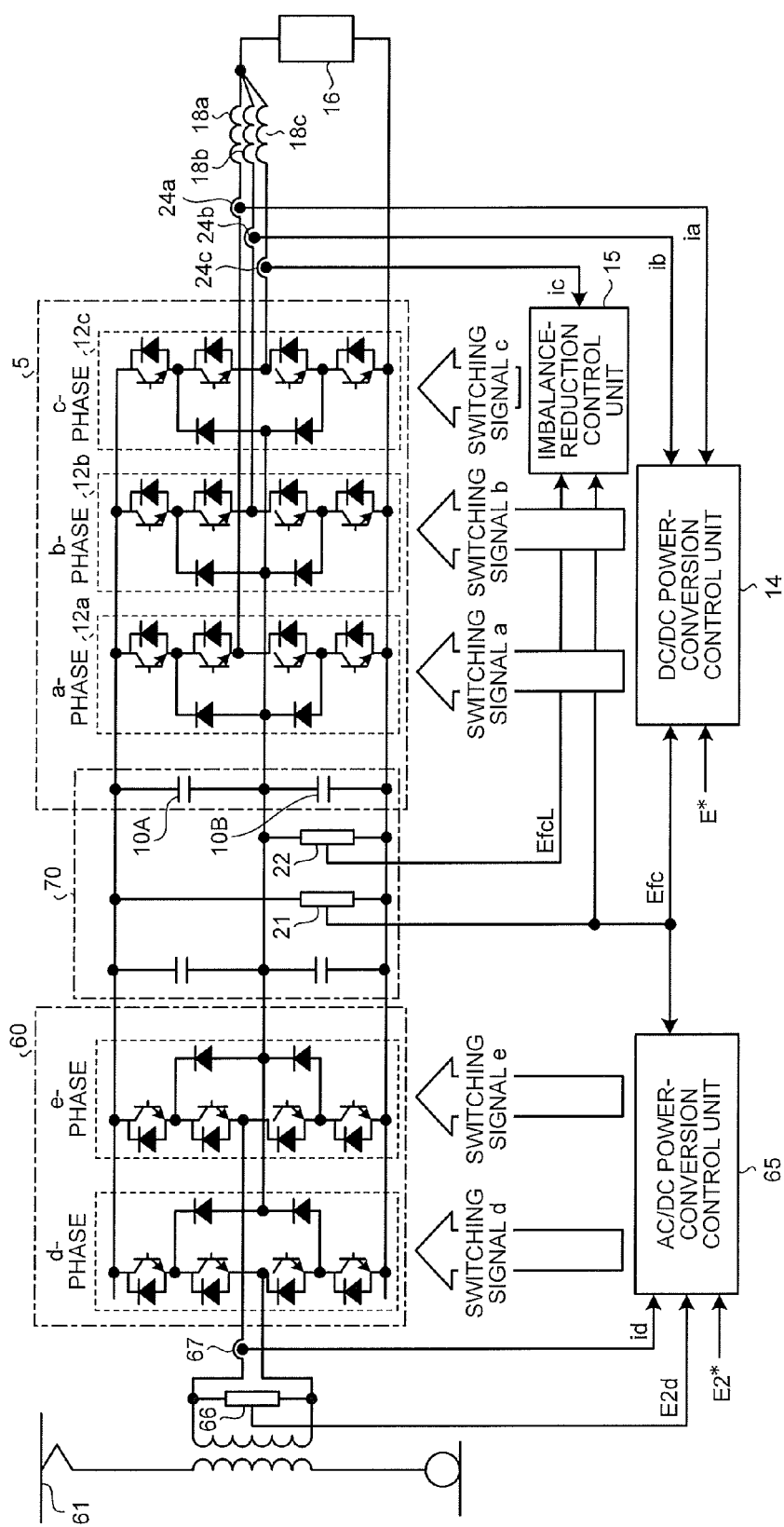
FIG. 20 is a diagram illustrating a modified example of a DC/DC conversion device according to a fifth embodiment.

FIG. 20 is a diagram illustrating a modified example of a DC/DC conversion device according to a fifth embodiment. FIG. 20 illustrates a configuration example as a modified example in the field of electric railway, in which AC power from an AC overhead wire 61 is converted to DC power; and this DC power is supplied to the DC/DC conversion device according to the first and second embodiments. Because the configuration of the right part of FIG. 20 is identical or equivalent to the configuration in FIG. 15, constituent elements thereof are denoted by like reference signs and redundant explanations thereof will be omitted.

As illustrated in FIG. 20, on the input side of the three-level three-phase main circuit 5, a three-level single-phase main circuit 60 is provided. This single-phase main circuit 60 operates as a single-phase AC/DC conversion device (a converter device) that supplies DC power to the three-phase main circuit 5.

A voltage (E2d) detected by an AC voltage detector 66 that detects an input AC voltage to the single-phase main circuit 60, a voltage command E2*, and a current (id) detected by an AC current detector 67 that detects an input current to the single-phase main circuit 60 are input to an AC/DC power-conversion control unit 65 that controls the single-phase main circuit 60. The AC/DC power-conversion control unit 65 generates switching signals "d" and "e" for controlling switching elements of the single-phase main circuit 60, and it outputs the generated switching signals to the single-phase main circuit 60.

In a case of a single-phase AC power supply with a low frequency, in the technique described in Patent Literature 1, it is presumed that a response to the imbalance-reduction control cannot satisfy a desired value, which makes it difficult to reduce the voltage imbalance. This point is the same as in the fourth embodiment. Meanwhile, as described in the fifth embodiment, the neutral point on the output side (the single-phase AC/DC power-conversion side) of the single-phase main circuit 60 and the neutral point on the input side of the three-phase main circuit 5 are electrically connected. In addition to that, imbalance-reduction control on the capacitors 10A and 10B is executed by an imbalance-reduction phase in the three-phase main circuit 5. Therefore, it is possible to execute imbalance-reduction control on the single-phase main circuit 60 with a desired control response.

In the modified example of the DC/DC conversion device according to the fifth embodiment, it can be configured such that another three-phase main circuit is connected in parallel to an intermediate DC voltage portion 70 that is an electrical-connection portion between the single-phase main circuit 60 and the three-phase main circuit 5 in order to drive the AC rotary machine. It can also be configured such that another single-phase main circuit is connected in parallel to the intermediate DC voltage portion 70 in order to increase the capacitance of a single-phase AC/DC power converter. Further, it can be configured such that another three-phase main circuit is connected in parallel in order to input DC power through three-phase AC/DC power conversion from a three-phase AC power supply. That is, the configuration in the fifth embodiment can be regarded as a configuration that makes it possible to simply and easily increase the number of AC rotary machines that are driven and increase the battery capacity.

Sixth Embodiment

Figure 21:
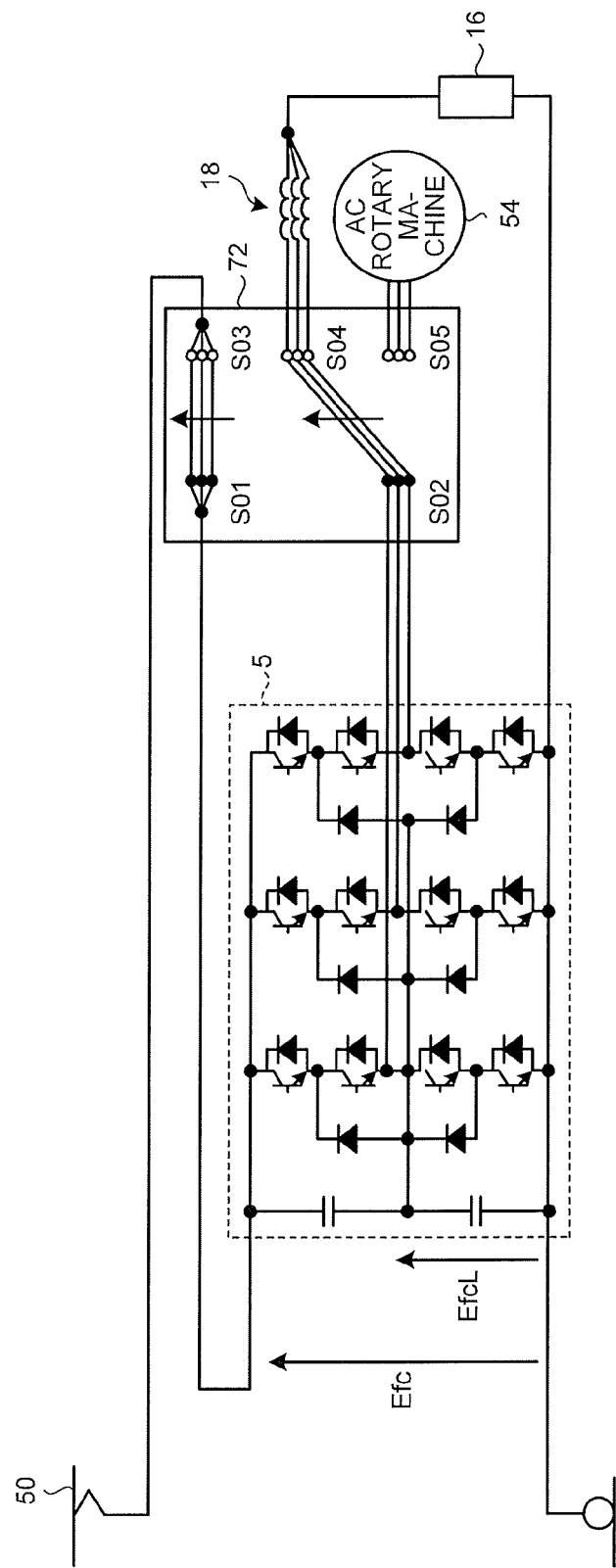
FIG. 21 is a diagram illustrating a modified example (charge/discharge of a battery through a DC overhead wire) of a DC/DC conversion device according to a sixth embodiment.
Figure 22:
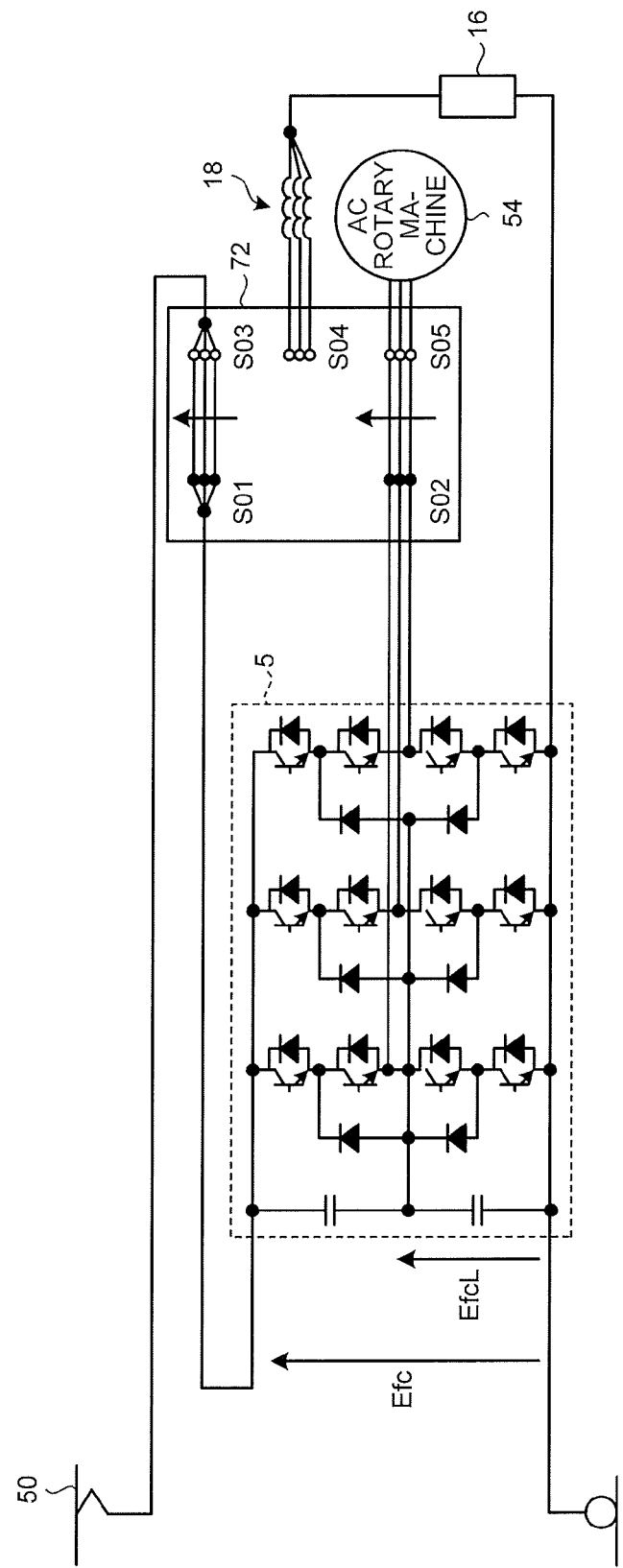
FIG. 22 is a diagram illustrating a modified example (drive of an AC rotary machine using power from the DC overhead wire) of the DC/DC conversion device according to the sixth embodiment.
Figure 23:
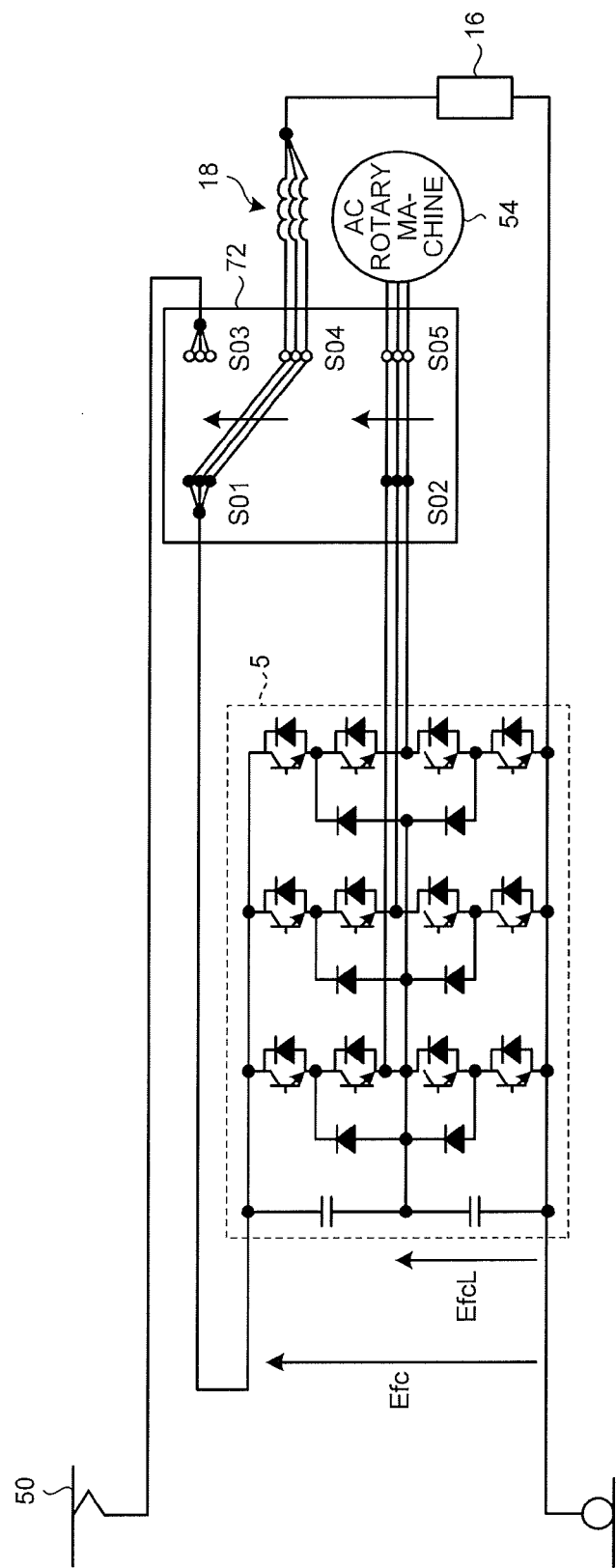
FIG. 23 is a diagram illustrating a modified example (drive of the AC rotary machine using battery power) of the DC/DC conversion device according to the sixth embodiment.

FIGS. 21 to 23 are diagrams illustrating a modified example of a DC/DC conversion device according to a sixth embodiment, FIGS. 21 to 23 illustrate a main-circuit configuration as a modified example in the field of electric railway, in which it is possible in a single three-phase three-level main circuit to charge and discharge a battery through a DC overhead wire, to drive an AC rotary machine using power from the DC overhead wire, and to drive the AC rotary machine using battery power.

A switch 72 includes terminals S01 to S05. The terminal S01 is electrically connected to a DC input-output terminal of the three-phase main circuit 5 (more specifically, a DC terminal on a high-order potential side of the three-phase main circuit 5). Similarly, the terminal S02 is electrically connected to DC/AC input-output terminals of the three-phase main circuit 5. The terminal S03 is electrically connected to the DC overhead wire 50. The terminal S04 is electrically connected to the positive terminal of the battery 16 through a reactor 18. The terminal S05 is electrically connected to the AC rotary machine 54.

In addition to the above connections, the switch 72 has a function of electrically connecting between the DC overhead wire 50 that is a DC power supply and the DC input-output terminal (see FIG. 21), a function of electrically connecting between the DC input-output terminal and the battery 16 (see FIG. 23), a function of electrically connecting between the DC/AC input-output terminals and the battery 16 (see FIG. 21), and a function of electrically connecting between the DC/AC input-output terminals and the AC rotary machine 54 (see FIG. 22).

When DC power is obtained from the DC overhead wire 50 to charge the battery 16, or when power is discharged from the battery 16, the terminal S01 and the terminal S03 are electrically connected. Further, the terminal S02 and the terminal S04 are electrically connected within the switch 72 as illustrated in FIG. 21. By using the imbalance-reduction control described in the first embodiment of the present application, it is possible to reduce variations in intermediate potential and to charge and discharge a battery.

Furthermore, when DC power is obtained from the DC overhead wire 50 to drive the AC rotary machine 54, or when regenerative power of the AC rotary machine 54 is returned to the DC overhead wire 50, the terminal S01 and the terminal S03 are electrically connected, and further, the terminal S02 and the terminal S05 are electrically connected within the switch 72 as illustrated in FIG. 22.

Furthermore, when DC power of the battery 16 is used to drive the AC rotary machine 54, or when regenerative power of the AC rotary machine 54 is used to charge the battery 16, the terminal S01 and the terminal S04 are electrically connected, and also the terminal S02 and the terminal S05 are electrically connected within the switch 72 as illustrated in FIG. 23.

As described above, according to the modified example of the DC/DC conversion device of the sixth embodiment, the configuration can be simply achieved, in which it is possible in a single three-phase three-level main circuit to charge and discharge a battery through a DC overhead wire, in order to drive an AC rotary machine using power from the DC overhead wire and in order to drive the AC rotary machine using battery power.

The configurations described in the above embodiments are only examples of the configuration of the present invention. The configurations can be combined with other well-known techniques. It is needless to mention that the present invention can be configured while modifying it without departing from the scope of the invention, such as omitting a part the configuration.

INDUSTRIAL APPLICABILITY

As described above, the present invention is useful as a DC/DC conversion device that can reduce variations in potential at a neutral point and a load-drive control system.

REFERENCE SIGNS LIST

1 DC circuit unit, 2 power-conversion circuit unit, 3 voltage control unit, 4 DC load, 5, 5A to 5C three-phase main circuit, 8A, 8B DC bus-bar, 10A, 10B capacitor, 12a to 12f power conversion circuit, 14, 14A, 14B DC/DC power-conversion control unit, 15 imbalance-reduction control unit, 16 battery, 17 DC/AC power-conversion control unit, 18, 18a, 18b, 18c reactor, 21, 22 voltage detector, 24a to 24f current detector, 31, 33 adder-subtractor, 32, 34, 41 PI control unit, 35 divider, 36 carrier comparison unit, 36A, 36B comparator, 37 dead-time generation unit, 38A, 38B inverting circuit, 50 DC overhead wire, 54 AC rotary machine, 60 single-phase main circuit, 61 AC overhead wire, 65 AC/DC power-conversion control unit, 66 AC voltage detector, 67 AC current detector, 70 intermediate DC voltage portion, 72 switch, D1a, D2a, D1b, D2b neutral-point clamp diode, S1a to S4a, S1b to S4b switching element.

The invention claimed is:

1. A DC/DC conversion device that is configured to include three-level power conversion circuits in a plurality of phases, each of the three-level power conversion circuits converting a voltage to three levels of potential by using a first and a second divided voltages respectively obtained by dividing an input DC voltage by using two capacitors connected in series, the DC/DC conversion device comprising:
   voltage detectors that detect at least two of the input DC voltage, the first divided voltage, and the second divided voltage; and
   a voltage control unit that controls an output voltage of the three-level power conversion circuits on the basis of a voltage command value,
   wherein at least one of the phases of the three-level power conversion circuits operates as an imbalance-reduction phase that executes imbalance-reduction control such that one of the first and second divided voltages is divided into a value that is half of the input DC voltage,
   wherein the three-level power conversion circuits except for the imbalance-reduction phase operate as a power conversion phase that performs DC-to-DC power conversion, and
   wherein each of the three-level conversion circuits is configured to operate as the imbalance-reduction phase, wherein the voltage control unit is configured to control a respective at least one of the three-level conversion circuits to operate as the imbalance-reduction phase by controlling a direction of current flow in the respective at least one of the three-level conversion circuits.

2. The DC/DC conversion device according to claim 1, wherein the voltage control unit includes an imbalance-reduction control unit that controls an output voltage of the imbalance-reduction phase by using two voltages that are detected by the voltage detectors.

3. The DC/DC conversion device according to claim 2, wherein the imbalance-reduction control unit outputs a switching signal such that unipolar modulation is performed on the imbalance-reduction phase.

4. The DC/DC conversion device according to claim 3, wherein the imbalance-reduction phase outputs two values of voltage by selecting either a high potential or an intermediate potential, or by selecting either the intermediate potential or a zero potential from the three levels of potential.

5. The DC/DC conversion device according to claim 1, wherein:
   a current detector is further provided to detect a current flowing into/out of an output terminal of the imbalance-reduction phase, and
   the voltage control unit includes an imbalance reduction control unit that controls an output voltage of the imbalance-reduction phase by using two voltages detected by the voltage detectors and by using a current detected by the current detector.

6. The DC/DC conversion device according to claim 5, wherein the imbalance-reduction control unit outputs a switching signal such that unipolar modulation is performed on the imbalance-reduction phase.

7. The DC/DC conversion device according to claim 1, wherein the voltage control unit outputs a switching signal such that dipolar modulation is performed on the power conversion phase.

8. The DC/DC conversion device according to claim 7, wherein the power conversion phase outputs two values of voltage by selecting either a high potential or a zero potential without selecting an intermediate potential from the three levels of potential.

9. The DC/DC conversion device according to claim 1, wherein a phase difference is set between a carrier waveform for controlling the imbalance-reduction phase and a carrier waveform for controlling the power conversion phase.

10. The DC/DC conversion device according to claim 1, wherein one of the phases of the three-level power conversion circuits is used as a three-level power conversion circuit that operates as the imbalance-reduction phase by switching between the three-level power conversion circuits.

11. The DC/DC conversion device according to claim 1, wherein a sum of a total number of three-level power conversion circuits that operate as the imbalance-reduction phase and a total number of three-level power conversion circuits that operate as the power conversion phase is a multiple of 3.

12. The DC/DC conversion device according to claim 1, wherein:
   the DC/DC conversion device is configured to connect a plurality of three-phase main circuits in parallel, each of the three-phase main circuits being configured by connecting the three-level power conversion circuits in parallel, and
   the DC/DC conversion device supplies respective outputs from the three-phase main circuits to a DC load.

13. The DC/DC conversion device according to claim 1, wherein:
   the DC/DC conversion device is configured by connecting a plurality of three-phase main circuits in parallel, each of the three-phase main circuits being configured to connect the three-level power conversion circuits in parallel, and respective intermediate potential portions of the three-phase main circuits are wired together.

14. A load-drive control system that drives or controls a DC load and an AC load, the system comprising:

a first three-phase main circuit that includes first three-level power conversion circuits in three phases, the first three-level power conversion circuits converting a voltage to three levels by using first and second divided voltages respectively obtained by dividing an input DC voltage by using two capacitors connected in series, and that sends/receives DC power to/from the DC load;

a second three-phase main circuit that includes second three-level power conversion circuits in three phases, the second three-level power conversion circuits converting a voltage to three levels by using the first and second divided voltages, and that sends/receives AC power to/from the AC load;

voltage detectors that detect at least two voltages among the input DC voltage, the first divided voltage, and the second divided voltage;

a first voltage control unit that controls an output voltage from the first three-phase main circuit on the basis of a voltage command value; and a second voltage control unit that controls an output voltage of the second three-phase main circuit on the basis of a torque command value, wherein at least one phase of the first three-phase main circuit operates as an imbalance-reduction phase that executes imbalance-reduction control such that one of the first and second divided voltages is divided into a value that is half of the input DC voltage, remaining phases of the first three-phase main circuit operate as a power conversion phase that performs DC-to-DC power conversion, and each phase of the second three-phase main circuit operates as a power conversion phase that performs DC-to-AC power conversion, wherein each phase of the first and second three-phase main circuits is configured to operate as the imbalance-reduction phase, wherein the first and second voltage control units are configured to control a respective at least one phase of the first and second three-phase main circuits, respectively, to operate as the imbalance-reduction phase by controlling a direction of current flow in the respective at least one phase of the first and second three-phase main circuits.

15. The load-drive control system according to claim 14, wherein:

the load-drive control system is configured by connecting the first three-phase main circuit and the second three-phase main circuit in parallel, and respective intermediate potential portions of the first three-phase main circuit and the second three-phase main circuit are wired together.

16. A load-drive control system that drives or controls a DC load, the system comprising:

a single-phase main circuit that converts an input AC voltage into three levels of DC voltage and outputs the three levels of DC voltage;

a three-phase main circuit that divides an output voltage from the single-phase main circuit into a first and a second divided voltages by using two capacitors connected in series, that includes three-level power conversion circuits in three phases, each of the three-level power conversion circuits converts a voltage to three levels by using the first and second divided voltages, and that sends/receives DC power to/from the DC load;

voltage detectors that detect at least two of an input DC voltage input to the three-phase main circuit, the first divided voltage, and the second divided voltage;

a first voltage control unit that controls an output voltage of the three-phase main circuit on the basis of a voltage command value; and a second voltage control unit that controls an output voltage of the single-phase main circuit on the basis of a voltage command value, wherein at least one phase of the three-phase main circuit operates as an imbalance-reduction phase that executes imbalance-reduction control such that one of the first and second divided voltages is divided into a value that is half of the input DC voltage, and remaining phases of the three-phase main circuit operate as a power conversion phase that performs DC-to-DC power conversion, wherein each phase of the three-phase main circuit is configured to operate as the imbalance-reduction phase, wherein the first voltage control unit is configured to control a respective at least one phase of the three-phase main circuit to operate as the imbalance-reduction phase by controlling a direction of current flow in the respective at least one phase of the three-phase main circuit.

17. A load-drive control system that drives or controls a DC load and an AC load, the system comprising:

a three-level three-phase main circuit that includes three-level power conversion circuits in three phases, each of the three-level power conversion circuits converting a voltage to three levels by using a first and a second divided voltages respectively obtained by dividing an input DC voltage from a DC power supply to the DC input-output terminal by using two capacitors connected in series, and that is capable of executing bidirectional power-flow control between a DC input-output terminal and a DC/AC input-output terminal;

voltage detectors that detect at least two of the input DC voltage, the first divided voltage, and the second divided voltage;

a voltage control unit that controls an output voltage from the three-phase main circuit on the basis of a voltage command value; and a switch that has a function of electrically connecting between the DC power supply and the DC input-output terminal, a function of electrically connecting between the DC input-output terminal and the DC load, a function of electrically connecting between the DC/AC input-output terminal and the DC load, and a function of electrically connecting between the DC/AC input-output terminal and the AC load, wherein when the load-drive control system drives or controls the DC load, the load-drive control system controls the switch so that the DC power supply and the DC input-output terminal are electrically connected and also so that the DC/AC input-output terminal and the DC load are electrically connected, at least one phase of the three-level three-phase main circuit operates as an imbalance-reduction phase that executes imbalance-reduction control such that one of the first and second divided voltages is divided into a value that is half of the input DC voltage, and remaining phases of the three-level three-phase main circuit operate as a power conversion phase that performs DC-to-DC power conversion, wherein each phase of the three-level three-phase main circuit is configured to operate as the imbalance-reduction phase, wherein the voltage control unit is configured to control a respective at least one phase of the three-level three-phase main circuit to operate as the imbalance-reduction phase by controlling a direction of current flow in the respective at least one phase of the three-level three-phase main circuit.

18. The load-drive control system according to claim 17, wherein when the load-drive control system drives or controls the AC load, the load-drive control system controls the switch so that the DC power supply and the DC input-output terminal are electrically connected and also so that the DC/AC input-output terminal and the AC load are electrically connected.

19. The load-drive control system according to claim 17, wherein when the load-drive control system drives or controls the AC load by using power of the DC load, the load-drive control system controls the switch so that the DC load and the DC input-output terminal are electrically connected and also so that the DC/AC input-output terminal and the AC load are electrically connected.

* * * * *